US 8,536,436 B2

(12) United States Patent
Moreno

(10) Patent No.: US 8,536,436 B2
(45) Date of Patent: Sep. 17, 2013

(54) SYSTEM AND METHOD FOR PROVIDING MUSIC BASED COGNITIVE SKILLS DEVELOPMENT

(76) Inventor: Sylvain Jean-Pierre Daniel Moreno, Toronto (CA)

( * ) Notice: Subject to any disclaimer, the term of this patent is extended or adjusted under 35 U.S.C. 154(b) by 0 days.

(21) Appl. No.: 13/090,677

(22) Filed: Apr. 20, 2011

(65) Prior Publication Data

US 2012/0090446 A1 Apr. 19, 2012

Related U.S. Application Data

(60) Provisional application No. 61/325,918, filed on Apr. 20, 2010.

(51) Int. Cl.
*G09B 15/00* (2006.01)

(52) U.S. Cl.
USPC ........... 84/470 R; 84/477 R; 84/478; 434/322

(58) Field of Classification Search
USPC ................ 84/600–602, 470 R, 477 R, 478
See application file for complete search history.

(56) References Cited

U.S. PATENT DOCUMENTS

| | | | | |
|---|---|---|---|---|
| 2,447,213 A * | 8/1948 | Sledge | ................... | 84/470 R |
| 3,733,957 A * | 5/1973 | Peirano et al. | ............... | 84/471 R |
| 3,919,913 A * | 11/1975 | Shrader | ........................... | 84/454 |
| 4,307,645 A * | 12/1981 | Rauchi | ............................ | 84/678 |
| 4,321,853 A * | 3/1982 | Tumblin | ........................ | 84/454 |
| 4,331,061 A * | 5/1982 | Morgando | .................. | 84/470 R |
| 4,364,299 A * | 12/1982 | Nakada et al. | .................. | 84/478 |
| 4,399,731 A * | 8/1983 | Aoki | ............................... | 84/609 |
| 4,416,182 A * | 11/1983 | Wise et al. | .................. | 84/470 R |
| 4,781,099 A * | 11/1988 | Koike | .......................... | 84/470 R |
| 4,832,605 A * | 5/1989 | Bragin | .......................... | 434/168 |
| 5,038,662 A * | 8/1991 | Ho | ................................... | 84/723 |
| 5,183,398 A * | 2/1993 | Monte et al. | .................. | 434/227 |
| 5,270,475 A * | 12/1993 | Weiss et al. | ..................... | 84/603 |
| 5,287,789 A * | 2/1994 | Zimmerman | ............... | 84/477 R |
| 5,496,179 A * | 3/1996 | Hoffman | ....................... | 434/433 |
| 5,529,498 A | 6/1996 | Cassily | | |
| 5,540,132 A * | 7/1996 | Hale | ........................... | 84/470 R |
| 5,563,358 A * | 10/1996 | Zimmerman | ............... | 84/477 R |
| 5,746,605 A * | 5/1998 | Kennedy | .................... | 434/307 R |
| 5,906,494 A * | 5/1999 | Ogawa et al. | .............. | 434/307 A |
| 6,057,501 A * | 5/2000 | Hale | ............................. | 84/470 R |
| 6,072,113 A * | 6/2000 | Tohgi et al. | ................. | 84/470 R |
| 6,211,451 B1* | 4/2001 | Tohgi et al. | ................. | 84/470 R |
| 6,323,410 B1* | 11/2001 | Rackow | ....................... | 84/470 R |
| 6,346,666 B1* | 2/2002 | Tsai et al. | ........................ | 84/637 |
| 6,353,168 B1* | 3/2002 | Sosoka et al. | ................... | 84/600 |
| 6,417,435 B2* | 7/2002 | Chantzis et al. | ............ | 84/477 R |
| 6,464,508 B1* | 10/2002 | Ryan | ............................. | 434/365 |

(Continued)

*Primary Examiner* — David S. Warren
(74) *Attorney, Agent, or Firm* — Rosenberg, Klein & Lee

(57) ABSTRACT

The present invention provides systems and methods for providing music based cognitive skills development. More particularly the present invention may provide a music based cognitive skills development platform. The platform is provided using computer implemented systems and methods for training a human subject so as to enhance his/her intelligence, attention, language skills and brain functioning. The present invention provides these benefits using exercises, one or more of which are based on musical training aspects, however, in addition to musical training other cognitive skills development exercises may be used, as described herein. The invention may be utilized by users of varying musical skills and may be presented at a level corresponding to the prior musical training (if any) of a user, and in a form corresponding to the cognitive capacity, interests and attention span of a user.

27 Claims, 35 Drawing Sheets

(56) References Cited

U.S. PATENT DOCUMENTS

| | | | |
|---|---|---|---|
| 6,504,090 B2* | 1/2003 | Tsai et al. ................... | 84/615 |
| 6,716,031 B2* | 4/2004 | Wood et al. .................. | 434/159 |
| 6,751,439 B2* | 6/2004 | Tice et al. .................... | 434/350 |
| 6,835,887 B2* | 12/2004 | Devecka ...................... | 84/743 |
| 6,870,085 B2* | 3/2005 | MacCutcheon ............. | 84/477 R |
| 7,122,004 B1 | 10/2006 | Cassily | |
| 7,199,298 B2* | 4/2007 | Funaki ......................... | 84/477 R |
| 7,271,329 B2* | 9/2007 | Franzblau .................... | 84/609 |
| 7,288,705 B1* | 10/2007 | Nelson ......................... | 84/10 |
| 7,323,629 B2* | 1/2008 | Somani et al. .............. | 84/470 R |
| 7,332,664 B2* | 2/2008 | Yung ............................ | 84/470 R |
| 7,435,891 B2* | 10/2008 | Perla ............................ | 84/470 R |
| 7,465,864 B2* | 12/2008 | Heintz ......................... | 84/470 R |
| 7,507,892 B1* | 3/2009 | Wissen ......................... | 84/470 R |
| 7,525,035 B2* | 4/2009 | Katsuta ........................ | 84/609 |
| 7,579,541 B2* | 8/2009 | Guldi ........................... | 84/470 R |
| 7,663,044 B2* | 2/2010 | Katsuta ........................ | 84/470 R |
| 7,667,120 B2* | 2/2010 | Suriano ........................ | 84/600 |
| 7,772,480 B2* | 8/2010 | Brennan ....................... | 84/615 |
| 7,806,759 B2* | 10/2010 | McHale et al. .............. | 463/7 |
| 7,919,705 B2* | 4/2011 | Miller .......................... | 84/616 |
| 7,989,689 B2* | 8/2011 | Sitrick et al. ................ | 84/723 |
| 8,148,621 B2* | 4/2012 | Bright et al. ................. | 84/609 |
| 8,242,344 B2* | 8/2012 | Moffatt ........................ | 84/609 |
| 8,273,973 B2* | 9/2012 | Kimmons et al. ........... | 84/282 |
| 8,319,083 B2* | 11/2012 | Adams ......................... | 84/470 R |
| 2001/0008100 A1* | 7/2001 | Devecka ...................... | 84/738 |
| 2001/0011496 A1 | 8/2001 | Mishima et al. | |
| 2001/0029829 A1 | 10/2001 | Moe | |
| 2001/0029830 A1* | 10/2001 | Rosen .......................... | 84/478 |
| 2001/0032539 A1* | 10/2001 | Chantzis et al. ............. | 84/478 |
| 2001/0045156 A1 | 11/2001 | Mishima et al. | |
| 2002/0002899 A1 | 1/2002 | Gjerdingen et al. | |
| 2002/0004191 A1* | 1/2002 | Tice et al. .................... | 434/350 |
| 2002/0035916 A1* | 3/2002 | Tsai et al. .................... | 84/622 |
| 2002/0043149 A1* | 4/2002 | Barlay ......................... | 84/470 R |
| 2002/0088337 A1* | 7/2002 | Devecka ...................... | 84/743 |
| 2003/0118975 A1* | 6/2003 | Stamm et al. ............... | 434/236 |
| 2003/0207239 A1* | 11/2003 | Langlois ...................... | 434/178 |
| 2005/0061140 A1* | 3/2005 | Vallery ........................ | 84/474 |
| 2005/0153267 A1 | 7/2005 | Goldman et al. | |
| 2005/0262989 A1* | 12/2005 | Franzblau .................... | 84/470 R |
| 2006/0107819 A1* | 5/2006 | Salter .......................... | 84/470 R |
| 2006/0141425 A1 | 6/2006 | De Ley et al. | |
| 2006/0196343 A1 | 9/2006 | Yung | |
| 2006/0199157 A1* | 9/2006 | Stamm et al. ............... | 434/236 |
| 2006/0288842 A1* | 12/2006 | Sitrick et al. ................ | 84/477 R |
| 2006/0292529 A1 | 12/2006 | De Ley et al. | |
| 2007/0017351 A1* | 1/2007 | Aruffo ......................... | 84/616 |
| 2007/0022866 A1* | 2/2007 | Perla ............................ | 84/609 |
| 2007/0039450 A1* | 2/2007 | Ohshima et al. ............ | 84/616 |
| 2007/0065789 A1 | 3/2007 | Goldman et al. | |
| 2007/0134631 A1* | 6/2007 | Hardy et al. ................. | 434/236 |
| 2007/0134635 A1 | 6/2007 | Hardy et al. | |
| 2007/0141541 A1* | 6/2007 | Chan et al. ................... | 434/236 |
| 2007/0227339 A1* | 10/2007 | Suriano ........................ | 84/612 |
| 2007/0288411 A1 | 12/2007 | Jenkins et al. | |
| 2008/0003558 A1 | 1/2008 | Chan et al. | |
| 2008/0060499 A1* | 3/2008 | Sitrick ......................... | 84/477 R |
| 2008/0078281 A1* | 4/2008 | Katsuta ........................ | 84/609 |
| 2008/0087160 A1* | 4/2008 | Gabert ......................... | 84/478 |
| 2008/0134861 A1* | 6/2008 | Pearson ....................... | 84/470 R |
| 2008/0271591 A1* | 11/2008 | Lemons ....................... | 84/601 |
| 2009/0038468 A1* | 2/2009 | Brennan ....................... | 84/609 |
| 2009/0069707 A1 | 3/2009 | Sandford | |
| 2009/0226860 A1* | 9/2009 | Garcia et al. ................ | 434/157 |
| 2010/0005952 A1* | 1/2010 | LaMon ........................ | 84/478 |
| 2010/0011938 A1* | 1/2010 | Adams ......................... | 84/470 R |
| 2010/0077906 A1* | 4/2010 | Hagstrom .................... | 84/470 R |
| 2010/0089221 A1* | 4/2010 | Miller .......................... | 84/470 R |
| 2010/0095828 A1* | 4/2010 | Adams ......................... | 84/470 R |
| 2010/0159426 A1* | 6/2010 | Thieberger Ben-Haim et al. ............................. | 434/169 |
| 2010/0192752 A1* | 8/2010 | Bright et al. ................. | 84/610 |
| 2010/0233661 A1* | 9/2010 | Franzblau .................... | 434/178 |
| 2010/0242709 A1* | 9/2010 | Salter .......................... | 84/483.2 |
| 2010/0313736 A1* | 12/2010 | Lenz ............................ | 84/477 R |
| 2011/0041671 A1* | 2/2011 | Moffatt ........................ | 84/610 |
| 2011/0094365 A1* | 4/2011 | Kimmons et al. ........... | 84/325 |
| 2011/0185879 A1* | 8/2011 | Cole ............................ | 84/470 R |
| 2011/0283866 A1* | 11/2011 | Hogan ......................... | 84/470 R |
| 2011/0318721 A2* | 12/2011 | Kespy-Yahi ................. | 434/319 |
| 2012/0090446 A1* | 4/2012 | Moreno ....................... | 84/470 R |

* cited by examiner

SYSTEM AND METHOD FOR PROVIDING MUSIC BASED COGNITIVE SKILLS DEVELOPMENT

FIELD OF THE INVENTION

The present invention relates to programs for training a human subject and in particular to systems and methods of increasing cognitive capabilities.

BACKGROUND OF THE INVENTION

Over the past several years scientists have consistently shown that formal musical training, such as learning to play an instrument, can improve cognitive performance. At the behavioural level, music expertise or training improves performance in other cognitive domains such as language, attention, intelligence and motor skills. These positive transfers are explained by findings which show that music training modifies brain areas related to the cognitive skills cited above, especially in those regions responsible for language, namely, planum temporale, Heschl's gyrus and inferior frontal gyrus.

Previous work has identified several factors that may be responsible for reading and language difficulties in children with low intelligence (LI). Various temporal and pitch auditory-processing deficits have been implicated. Impaired pitch processing within natural speech may contribute to deficient phonological representations in LI children that may, in turn, lead to a deficit in reading skills. It has been demonstrated that audio-visual training (computerized) improved the level of performance of LI children, and normalized their pattern of brain waves. A landmark study by Dr. Overy at the Massachusetts General Hospital tested a musical remediation program with LI children that suggested a positive effect of musical training on both phonologic and spelling skills. This further supports the rehabilitative potential of music training. In 2008 Forgeard et al at Harvard University conducted a longitudinal study with normal-reading children and a pilot study with LI children. Their results indicated a strong association between musical discrimination abilities and language-related skills. In children with LI, musical discrimination predicted phonological skills, which in turn predicted reading ability. Taken together, these findings suggest that music intervention that strengthens the basic skills for auditory perception in children with language impairments may also remediate some of their language deficits.

Brain imaging techniques show which brain areas of the brain are influenced by music stimuli. Using structural MRI to examine brain structure, many scientific studies have shown anatomical differences between the brains of musicians and non-musicians. For example, a study by Schlaug et al. (1995b) showed a link between musical expertise and the brain. The study questioned whether the midsagital area of the corpus callosum, which is involved in the coordination of movement, is influenced by musical expertise (in this case, in keyboard or string instrument players). Results showed a significantly larger anterior half of the corpus callosum in musicians than in non-musicians. From this finding, Schlaug et al. (1995b) concluded that early and intensive training in keyboard and string players may facilitate increased and faster communication between the brain's hemispheres in order to perform complex bi-manual movements. Several further studies have also demonstrated structural differences between musicians and non-musicians' brains, finding significant differences in the planum temporale (related to verbal memory processing and absolute pitch), the posterior band of the precentral gyms (related to motor processing), the corpus callosum (related to cross-hemisphere communication), the anterior-medial part of the Heschl gyms (related to auditory processing), the inferior frontal gyrus (related to executive functions such as attention and language), the inferior lateral temporal lobe (related to auditory processing) and parts of the cerebellum (related to motor processing). All the brain areas cited above are involved in behavioural skills related to music processing.

SUMMARY OF THE INVENTION

In one aspect the present invention is a system for training cognitive ability of a user comprising at least a first, a second, and a third level of increasing difficulty, and wherein each of the levels of difficulty comprise exercise training modules selected from at least three of the following musical categories: rhythm; voice awareness; musical ear; music theory; musical product; and creativity.

In another aspect the present invention is a computer implemented method for training cognitive ability of a user, said method being implemented by one or more computer processors and comprising: grouping at least two exercises selected from at least two of the following musical categories: rhythm; voice awareness; musical ear; music theory; musical product; and creativity into one or more exercise training modules, said exercise training modules being of two or more levels of increasing difficulty; and presenting one of the at least two exercises to a user as part of one of the one or more exercise training modules, said exercise being at a level of difficulty appropriate for the user.

In another aspect the present invention is a system of music based cognitive training comprising: at least one computer; and a computer program including computer instructions, which when made available to the at least one computer, are operable to define a music based cognitive training utility that is operable to improve one or more cognitive functions of an individual, wherein: the music based cognitive training utility includes or defines a series of exercises consisting of musical training exercises linked to improving cognitive function, and that cumulatively define a music based cognitive training module, wherein each of the series exercises includes two or more exercise components, the exercise components being associated with different levels of difficulty; the music based cognitive training utility includes or is linked to a performance monitoring utility for monitoring and recording the performance of the individual in each exercise component; the music based cognitive training utility being operable to present to the individual, once the individual has achieved a minimum performance threshold for a first exercise component, a subsequent second exercise component or N exercise component associated with an increasing level of difficulty relative to the preceding exercise component, based on operation of the performance monitoring utility; such that the music based training facility is operable to enable adaptive training of the individual to improve iteratively the performance of the individual following the music based cognitive training module, thereby providing improved cognitive functions through music based training.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
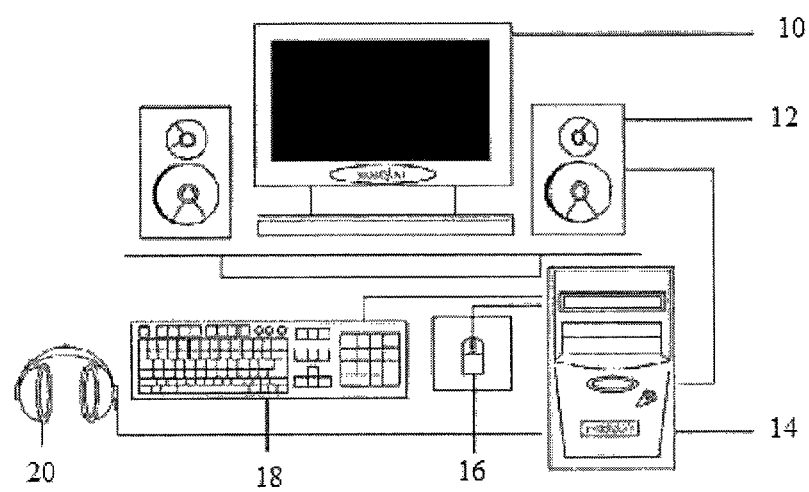
FIG. 1 is a general diagram of an individual computer system that would be used to implement training or remediation of verbal intelligence, attention, reading and/or language skills and/or brain functioning for one user.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF EMBODIMENTS

The present invention provides systems and methods for providing music based cognitive skills development. More particularly the present invention may provide a music based cognitive skills development platform. The platform is provided using computer implemented systems and methods for training a human subject so as to enhance his/her intelligence, attention, language skills and brain functioning. The present invention provides these benefits using exercises, one or more of which are based on musical training aspects, however, in addition to musical training other cognitive skills development exercises may be used, as described herein. The invention may be utilized by users of varying musical skills. The invention may be presented at a level corresponding to the prior musical training (if any) of a user, and in a form corresponding to the cognitive capacity, interests and attention span of a user. Performance of a user may dictate the progression of the present invention through available levels.

In some embodiment of the present invention, the preferable user may be approximately between the ages of 3-6. In this embodiment of the present invention the exercises, lessons, modules and levels of difficulty of each may be designed to train children. A skilled reader will recognize that users of other ages may utilize embodiments of the present invention, and that the exercises, lessons and/or modules, and the difficulty of each of these, may be designed to train users of other ages, with particular developmental limitations, such as physical or mental limitations.

One embodiment of the present invention, may incorporate a system and method for enabling individuals with or without speech, language and reading based communication disabilities, due to auditory or cognitive processing problem, or individuals with or without developmental problem such as low intelligence and attention disabilities, to improve their brain processing in relation to language, attention, memory and intelligence, among other skill sets. In use, the system and method function to stimulate brain areas involved in these skills sets cited above. The system and method of the present invention may train language, attention, memory, motor and intelligence skills in individual users through the use of music components such as discriminating sound, singing and producing sounds and movements related to sounds. The present invention may include methods for, and computer software, such as a computer program product, to, adapt the method parameters related to duration, intensity, and level to a user based upon performance.

In another embodiment of the present invention, be a training system may be specially tailored to young children and designed to enhance the cognitive capabilities of these children. The system may include the provision of musical training exercises at adjusted levels of difficulty in response to the user's performance. The training system may be provided in a computer game or video game format that is tailored to the attention span, interests, and cognitive capacities of young children. This system may cause users to attain musical skills in a manner which is entertaining and self-rewarding. Children may want to play the games that increase their intelligence.

In yet another embodiment of the present invention, the music-based cognitive skills development platform may be used by children, independent of requiring any prior musical training for the children or parents of children who may also participate in the musical game training. The system, method and platform of the present invention may be utilized by persons who have any level of musical training, or have no prior musical training at all.

In still another embodiment of the present invention, the systems and methods may be presented to a user as an animated game. The users may learn rhythm, voice awareness, musical ear, music theory, singing, and/or creativity/production skills by utilizing the present invention. The learning may occur through use of the present invention that is in the form of a comprehensive music based cognitive skills development platform.

The exercises, lessons or modules presented to the user may be in a particular order, or may be in any order chosen by the present invention to address the specific requirements of a particular user, as determined utilizing information and data regarding a user that is collected by the present invention. For example, in one embodiment of the present invention, a music based cognitive training utility may present exercises to a user in the following order: at least one exercise based on rhythm; at least one auditory exercise; and at least one singing exercise.

The invention may further provide for adaptively presenting certain musical exercises at adjusted levels of difficulty based upon a user's performance. Additionally, the training may consist of balanced training that includes exercises configured to provide specially selected categories of training during each part of the training, wherein each category is selected to train and draw upon different musical skills. The categories of musical training may include rhythm, voice awareness, music ear, music theory, singing, and creativity/production. These categories may appear in a specific order for learning purposes and each category is represented by several exercises.

The present invention may involve the rotation of the human subject through a series of cognitive skills development focused exercises that are designed in terms of content and duration of the exercise to capture the attention of the human subject, and retain that attention. The platform of the present invention may be operable to guide the human subject through a series of exercises that individually and cumulatively capture and retain his/her attention. The present invention may combine varying levels of difficultly, and monitoring of performance of the user.

The duration of exercises may be chosen to correspond to the level, attention span and/or other characteristics of the user. For example, the duration of each exercise may last between 5 to 10 minutes depending of the user. The exercise duration may be stable through the categories of levels provided to a particular user, or the exercise duration may vary. A skilled reader will recognize the variety of exercise levels and durations that may be provided to a particular user, in accordance with characteristics of the user, such as level, prior musical training, performance, attention span, etc.

For the rhythm skills, the method may train a subject to associate the target musical note with a character, for example, such as associating the target musical note C4 with a character that is a turtle. This association may train a user to distinguish between an auditory presented rhythm, for example, such as a musical beat, and another rhythm. A user may thereby be able to realize moves with the beat. For example, the beat of a song may determine how fast or how slow the subject should move his body. The user may be able to create rhythm with a pre-determined beat object.

All along this training to improve cognitive functions may utilize musical tones relating to musical notes, for example, such as Do-C4, Re-D4, Mi-E4, FaF4, Sol-G4, La-A4, Ti-B4, Do-O5. Each of the above musical notes may be represented respectively by a visual-cue, such as visual-character or shape or image or color, and said corresponding visual shape/character/color producing a non-visual sound corresponding to the musical note. For example, animal characters may be paired with musical notes, so that an animal character represents a particular musical note. The method may provide directions for the user to recognize the relationship between tones and characters.

The present invention may provide voice awareness skills. The present invention may train a subject to warm the subject voice, to use their vocal range, volume, scooping voice and vocal ornamentations using choral speaking, find voice projection and vocal mime using simple song, simple movements and voice mime. The user may further be trained by exercises to enhance, construct or express meaning utilizing the voice.

The present invention may offer musical ear skills. The present invention may train a subject to identify the tones of the animals paired with musical notes by listening to their sounds, to distinguish between an auditory presented musical note, for example, such as C4 or Do, and other musical notes, for example, such as D4, E4, F4, G4, H4, A4, B4, C5, to recognize music tones during the distractions of various environments, and to internalize and reproduce the heard melody.

The present invention may offer music theory skills. The present invention may train a subject to recognize and name the music tones paired with animal characters, to associate the music scale with the human body by using an image of a student's body, to distinguish the lines and spaces of the grand staff, to place the animals on the grand music staff by the music tones they produce, and to recognize the music tones and the animals that the tones belong to on the grand music staff.

The present invention may offer singing skills. The present invention may train a subject to produce sound at the correct pitch and to memorize simple meaningful linguistic lyrics. The present invention may further require the user to learn singing skills generally, as well as song lyrics. Particular moves, such as body movements, may also be combined with the song lyrics, so that a user learns to sing and move in accordance with the song lyrics.

The present invention may offer creativity/production skills. The present invention may train a subject to develop his or her fine motor skills related to writing (e.g., arm, hands and fingers), to recognize the position of the tones and their relations on the staff, the grapheme-tone conversion, by training their writing skills, to associate the images with the different styles of music, to develop the spatial- and spatial reasoning skills by using puzzle, and to associate music with color and geometrical form.

In one embodiment of the present invention, a method for adaptively training a subject to improve his memory by using questions, sounds, words, melodies, songs, images and objects may be provided. For example, this aspect of the invention may be presented as a memory module, or other module of the invention.

In another embodiment of the present invention, a method for adaptively training a subject to improve his/her intelligence score by using tasks involving acoustic and verbal stimuli may be provided.

In yet another embodiment of the present invention, a method for adaptively training a subject to improve executive function, for example, such as control, attention, inhibition, switching brain processes, with tasks stimulating this processes using acoustic, visual and verbal stimuli in time frame manner may be provided.

The present invention may be a system of musical training that includes training modules for increasing cognitive functions. The training may include multiple levels of training. For example, at least a first, a second, and a third level of training may be provided. Each level may be of varying difficulty. For example, a first, second and third levels of training may be of increasing difficulty. Each of the levels of difficulty may provide exercise training modules from at multiple musical categories. For example, at exercise training modules may be included from least three of the following six musical categories: rhythm; voice and vocalization; musical hearing/auditory training and sound discrimination/recognition; music theory; singing training; and musical creativity.

The present invention may be a system of musical training that includes at least one computer; and a computer program product including computer instructions, which when made available to the at least one computer. The computer instructions may define a music based cognitive training utility that is operable to improve one or more cognitive functions of an individual. The music based cognitive training utility may include or define a series of exercises consisting of musical training exercises linked to improving cognitive function, and may cumulatively define a music based cognitive training module, wherein each of the series exercises includes multiple exercise components, for example, such as two or more exercise components.

The exercise components may be associated with different levels of difficulty. The music based cognitive training utility may also include, or be linked to, a performance monitoring utility for monitoring and recording the performance of the individual in each exercise component. The music based cognitive training utility may be operable to present to the individual, once the individual has achieved a minimum performance threshold for a first exercise component, a subsequent second exercise component, or N exercise component, associated with an increasing level of difficulty relative to the preceding exercise component, based on operation of the performance monitoring utility. As a result, the music based training facility may be operable to enable adaptive training of the individual to improve iteratively the performance of the individual following the music based cognitive training module, thereby providing improved cognitive functions through musical training.

The present invention may be utilized to improve verbal intelligence, attention, reading and language skills.

The present invention may also provide a training strategy for rapidly and progressively improving the verbal intelligence, attention, reading and/or language skills.

The present invention may also employ color, characters, stories, sound, music and/or songs for generating changes in brain processing involved in verbal intelligence, attention, reading and language skills by the brain achieved through learning exercises.

The present invention may also use a modified version of this training strategy as a method for screening human populations to identify those individuals who would benefit from this invention.

The present invention may also provide a training strategy for rapidly and progressively improving the verbal intelligence, attention, reading and language skills in individuals that have suffered brain damages or brain abnormal development.

The present invention may also provide a training strategy for rapidly and progressively improving the verbal intelligence, attention, reading and language skills in individuals who have undergone age-related or disease related deterioration of their verbal intelligence, attention, reading and language processing abilities.

The present invention may also provide easier sound and language discrimination in the learning of a foreign language.

The present invention may also provide improved verbal intelligence, attention, reading and language skills in individuals without pathology, to improve their learning capabilities and their potential cognitive achievements.

In one embodiment of the present invention, a method of increasing the ability of a human being to process aurally received signals may be disclosed. The method may consist of sound, music, melodies, and songs in a computerized system. The method may include multiple steps. For example, the method may include the following of 6 steps in one session during x number of sessions, depending on the characteristics of the user. For example, depending on the performance of the user, or other characteristics. The 6 steps may be different types of exercises, for example, such as based on rhythm perception and production, voice/sound production, audio discrimination, singing discrimination and production, conceptualization of knowledge and creation of new concepts related to music production. The method may conduct the training session through a computerized program, for example, such as through software or another computer program product. The training may adapt the difficulty and the steps depending of the user's performance, for example, such as is indicated by the tracking progress module of the present invention that is operable to analyze and determine a user's performance. The present invention may include a means of providing feedback, for example, such as positive and/or negative feedback, to the user. The feedback may depend on the user's performance. The feedback may be provided at varying points, for example, such as after each step. The feedback may be provided in a variety of means, for example, such as aural feedback provided through memory module, written text feedback, or other means.

The present invention may provide video-game software in accordance with the invention that may be implemented on a DVD which can be presented by a computer.

The present invention may provide video-game software based on the present invention that may be implemented on any video-game system such as Wii™, or an a hand-held smart-phone, or on a customized portable device which allows user input in the form of key-presses or by direct measurement of a persons behavior and vocalization using a web-camera, microphone, and/or movement sensors.

The present invention may involve exercises that require a user to move one or more body parts in synchronization, or virtual synchronization, with a musical rhythm. The body parts that the user may be required to move may include one or more of the following: hands; arms; shoulders; feet; legs; head; or whole body. The musical rhythm may include a reference rhythm that may have occurrences separated by time intervals for each difficulty level, so that difficulty is related to at least one of the following: increasing tempo; slowing tempo; medium tempo; alternating tempo; and fast tempo. The difficulty may further be influenced by the particular one or more body parts that the user is expected to move to the rhythm.

The present invention may provide video-game training in which the levels of difficulty, and musical exercise categories which are presented, are adjusted based upon review of the user's performance, in connection with a music based cognitive skills development utility.

The present invention may adapt the lesson to the user performance. For example, the training may be divided in 6 levels of difficulty in one implementation. The user may be required to reach 75% of success minimum to reach the next level. For example, the user performance may be required to be equal or superior to 75% of success in the exercise of level 1 to reach the level 2. This '75%' mark may not change through the levels only the difficulty of the exercise will increase through the levels. Level 2 may be more difficult than level 1; level 3 may be more difficult than level 2, and so on. For example, the difficulty may be represented by using more complex rhythms or melodies, increasing the number of sound to discriminate, the number of elements to remember or to use in a game. A skilled reader will recognize that other exercise performance rate targets may be set, for example, such as approximately 65% to 85% of correct questions answered in response to questions posed by a (for an exercise, a lesson or a module, or for a present exercise, lesson or module as well as preceding exercises, lessons and modules), or approximately 65% to 85% of overall performance by a user (for an exercise, a lesson or a module), or any other measure. The performance rate target may be a selected percentage of the exercise training modules or lessons. The performance rate target may also represent a minimum performance threshold that must be met before exercises of an increase difficulty may be presented to the user.

The present invention may incorporate an exercise manager, or other module manager. This element of the present invention may be operable to guide a user through the exercise elements, including levels of training and training modules generally.

The present invention may further incorporate a performance analysis means element. The performance analysis means element may be incorporated in the exercise manager component of the system of the present invention. The performance analysis means element may be operable to analyze the performance of a user during an exercise. One possible result of the analysis may be to determine the appropriate level of exercises, or modules to be presented to a user. In this manner the performance analysis means element may be utilized by the present invention to cause the exercises and modules presented to a user to be appropriate to that user and to further develop the user's cognitive skills. The performance analysis means element is therefore utilized by the present invention to help to tailor the experience and training of a user of the present invention, so that the experience and training is appropriate to that particular user. The subsequent exercise or module to be presented to the user by the present invention may be chosen by the present invention in accordance with the analysis and determination of the performance analysis means element.

In one embodiment of the present invention, the performance analysis means element may transfer information, analysis and determinations to a data storage means, so that information, analysis and determinations relating to a user may be stored and recalled when a user utilizes the present invention at a future date. In this manner, the appropriate level of a user may be obtained by the present invention when a user begins to utilize the present invention, if that user has utilized the present invention at a prior point in time.

Generally, when a user initiates use of the present invention, a user will log in. The log in process may take several forms, for example, in one embodiment of the present invention the user may provide identifying information and may be asked to choose an avatar. A skilled reader will recognize the variety of log-in options that may be presented to a user, in accordance with specific presentation of the present invention, for example, such as by laptop, an website presentation, an e-reader, a tablet, etc.

Once a user is logged on, the present invention may search for information relating to any prior use of the present invention by the user. For example, such information may provide guidance to the exercise manager regarding the possible levels of use that the user will undertake. If no such information is provided the exercise manager will choose a starting level for the user, or may provide a basic initial level exercise provided to all first-time users. The basic initial level exercise may be utilized to determine the level of the user.

An exercise manager may guide a user through exercises. The exercises may be divided into modules, lessons and levels. The combination of exercises provided to a user may vary, and may be tailored to a specific user. The choice of exercises, and any tailoring, may occur in accordance with information gathered while a user undertakes an exercise. Such information may be analyzed as described herein, and the analysis may provide information to the present invention regarding the skill, level, attention span, or other characteristics of a user. This information may be utilized to determine the best presentation of exercises, including the level, types, format (such as in video game style, or other styles or formats) and order of exercises, to be presented to a user that will best support the learning and progression of skills of the user.

As an example, exercises may be organized into lessons. In one embodiment of the present invention a lesson may include six exercises. The lesson may include one exercise in each of the following categories: rhythm, voice awareness, musical ear, theory, musical product and creativity. The user may advance through the exercise independently of his performance. Generally, the user will be guided to advance through lessons in accordance with his performance. In this manner his performance may be monitored and analysis of his performance may be utilized to choose the next appropriate lessons to be presented to a user. Multiple lessons may exist in this embodiment of the present invention, and each lesson may include the same number of exercises in the same categories.

As a further specific example, in each exercise the user may be presented with a video tutorial, and an example. The user may be allowed to play the exercise after watching the tutorial and example. After playing for a specific period of time, such as five minutes, the exercise may be terminated. Upon termination the user may be asked to answer a series of questions related to the exercise. After answering the questions, the user may be presented with the next exercise. A lesson may be repeated until a user is recognized to have reached a reasonable performance level. Such levels may be chosen by a controller of the present invention, such as a clinician, or may be hard-coded into the present invention. Specifically, the user may move to an increased level of difficulty when his performance is identified as having met a defined percentage of success. At the end of a lesson, the user may be provided with feedback regarding his performance. Such feedback may be provided in a variety of means, such as verbally, visually (for example, as a plotting on an interactive map wherein a higher position equals higher success by the user), or any other means.

Figure 35:
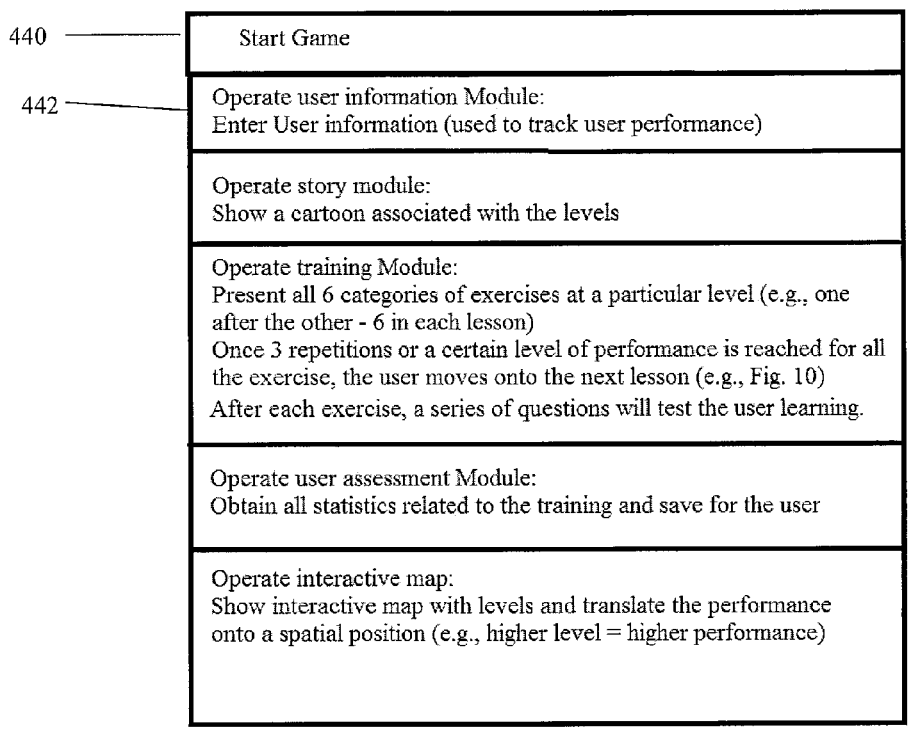
FIG. 35 is a table showing the possible steps of a method of one embodiment of the present invention.

In another example of the present invention, as shown in FIG. 35, a user may be presented with exercises that are a set of games. The user may choose to start a game 440 and indicate this choice to the present invention. A user information module 442 may be presented to the user, and the user may be required to enter user information. This information may be utilized to determine if the user has previously utilized the present invention and if there is any information relating to the user's level of performance.

The present invention may function in a story module and therefore may present a cartoon associated with the levels to the user. A training module may be operated by the present invention to provide exercises to a user at a particular level. There may be six exercises for a particular level, and the exercises may represent six categories of exercises. After each exercise a series of questions may be presented to the user. These questions may test the user's learning. The answers to the questions provided by the user may be utilized in the analysis to determine the level of performance of the user. The level of the user may be determined as a percentage of success or some other measure. Once three repetitions of a certain level of performance is reached for all of the exercises in the lesson, the user may be able to move to a lesson at a higher level of difficulty.

In the story module one or more story components may be presented, for example, such as one or more characters and a story line. Exercises may be presented utilizing the one or more story components.

After a user completes an exercise, or a set of exercises, a module, or a lesson, a user assessment module may be operated by the present invention. As described herein, this module may utilize information gathered during monitoring of one or more exercises performed by a user, the questions answered by a user, and any other information to analyze and assess the level of performance of a user. This information may be stored in a data storage means.

A clinician, or other professional, may further obtain information or other data regarding the user's performance and interaction with the present invention. This information and other data may be utilized by the clinician to assess the user's performance. This assessment may be applied to a determination as to whether a user should be presented with exercises, lessons or modules at an increased level of difficulty. Should the clinician determine that the level of difficulty should be increased, the clinician may act as a controller of the present invention and thereby cause the present invention to present exercises, lessons or modules to the user of an increased level of difficulty.

Feedback regarding a user's performance may be provided to the user in the form of an interactive map. The map may show levels of performance and may present the user's performance as a spatial position on the map, that indicates the level or performance of the user in a visual means.

A skilled reader will recognize the variety of embodiments that the present invention may include. These may vary due to the format and type of platform for the present invention, such as a laptop, Internet website, e-reader, tablet, video console, etc., whereby the present invention is provided to a user. The embodiments of the present invention may also vary in accordance with the characteristics of the user, including the attention span, prior musical training, performance level and other characteristics of the user. The grouping of exercises into modules, set or lessons may, and the ordering and presentation of these to a user may also vary in embodiments of the present invention, in accordance with the determination of the best means of training a user to improve cognitive skills through use of the present invention. Presentation of feedback and other aspects of the present invention may also vary in embodiments of the present invention. Measures, such as performance level success required to advance to a greater level of difficulty, and number of repetitions of an exercise that may be permitted by the present invention, and other measures may also vary between embodiments of the present invention, as may the persons authorized to amend such measures. In some embodiments of the present invention measures may be amended by authorized persons, and in other embodiments it may not be possible to amend some/any measures.

The present invention may offer particular advantages and benefits over the prior art.

Referring now to FIG. 1, there is shown a system of the present invention that may be appropriate for use with a single user. A computer 14 may be a regular system which can be found in any store. For example, such as a personal computer incorporating at least the following elements: any Operating, System, although at least a 32-bit may be preferred; a Processor that is minimum 1.6 GHz Intel, or AMD Processor, and a faster processor speed and dual/quad core processor may be preferred; Memory that is at least 2 GB; a Disk that is at least 80 GB, although 120 GB or larger may be preferred; and one or more External Ports that may include a USB port that is a 2.0, CD ROM, a DVD, and/or other ports.

The system of the present invention may be incorporate various types of computer or presentation elements. For example, the computer may be a laptop or desktop computer, and the present invention may be presented by way of a video game console, an e-reader, a tablet, an interactive book, an interactive white board, a video presentation (such as a television (TV) show, a CD, a DVD), by a web site. A skilled reader will recognize the variety of media that may be utilized to present the present invention.

In some embodiments of the present invention it may not be required that a user provide responses to the present invention. For example, an embodiment of the present invention that is provided as a video presentation, such as a TV show, may not require that a user provide responses, such as responses to a memory module as described herein. The memory module questions may be presented to the user, so that the user has the chance to test his learning, but no responses to the questions may be provided by the user to the present invention. Consequently, in the embodiment of the present invention, analysis, calculations and reporting based on the responses will not be provided to the user.

This embodiment of the present invention may present the exercises, lessons and/or modules to the user in a variety of manners. Fro example, the present invention may present a standard order of exercises, lessons and/or modules to a user, so that the user does not make specific choices about the order of the exercise, lessons or modules viewed. In other embodiments of the present invention a user may be able to make specific choices, including the level of difficulty of exercises, lesson and/or modules to be viewed. For example, a user may choose exercises, lessons and/or modules at a specific level to be viewed. A user may also possibly choose the order of exercises, lessons and/or modules to be viewed. A user may make this choice if the embodiment of the present invention is in the format of a TV show, CD or DVD by making choices regarding the video to be viewed, in the same manner as particular episodes, or scenes are chosen on TVs, CDs or DVDs presently, or in any other manner of choosing. In this manner a user may choose the exercises, lessons and/or modules to be viewed, and the order that these are viewed in.

The system of the present invention may include a database, server and/or other storage means, whereby elements of the computer program product of the present invention or other elements of the present invention may be stored. For example, the results or other information relating to a user's session while utilizing the present invention may be stored to a data storage means. The data storage means may be incorporated in the system of the present invention or may be remotely linked, through a wired or wireless connection, or via a remote access means, such as the Internet, to the present invention.

The system of the present invention may further include any of the following: a screen 10, for example, such as a screen having a display of 1024×768 at 16M colors minimum; one or more speakers 12, for example, such as speakers having a frequency response of 60 Hz-24 kHz and a sensitivity of 89 db; one or more headphones 20, for example, such as headphones having a frequency response of 5 Hz-29 kHz and a sensitivity of 89 db; a mouse 16; and a keyboard 18.

Figure 2:
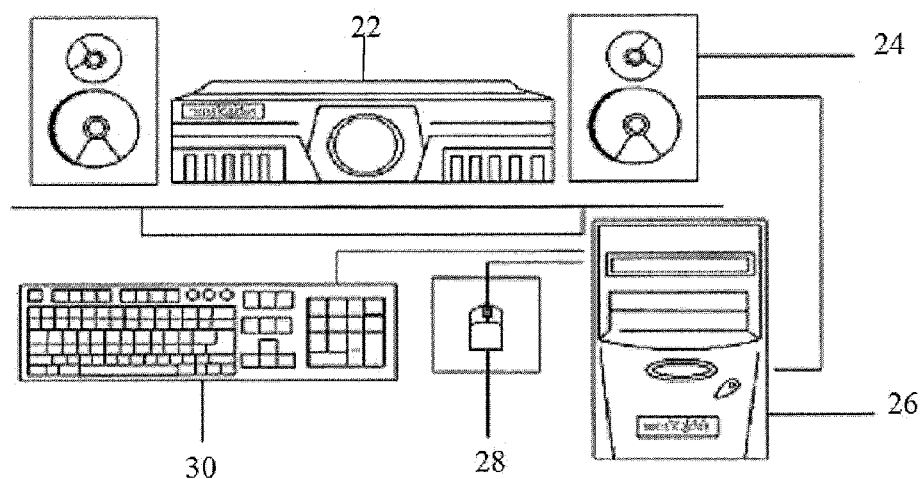
FIG. 2 is a general diagram of a classroom set up computer system that would be used to implement training or remediation of verbal intelligence, attention, reading and/or language skills and/or brain functioning for a group format.

The system of the present invention may have a variety of set up. As shown in FIG. 2, the system may be set-up in a manner that is appropriate for use in a classroom set up. A personal computer 26 is a regular system which can be found in any store: Any Operating System (32-bit preferred), Processor: Minimum 1.6 GHz Intel or AMD Processor (Faster processor speed and dual/quad core processor highly recommended), Memory: 2 GB minimum (more recommended), Disk: 80 GB minimum (120 GB or larger recommended), External Ports: USB (USB 2.0 recommended), CD ROM and DVD.

In one embodiment of the invention, the computer 26 may be realized using a video projector 22 with a brightness equal or superior to 45 lux and a resolution of 640×240, speakers 24 with a frequency response of 60 Hz-24 kHz and a sensitivity of 89 db, a basic mouse 28, and a keyboard 30.

The system of the present invention may be operable to develop and provide appropriate training programs to users. The system may be utilized by a user to practice their skills, and, in particular, to overcome handicaps or deficits in language, intelligence, attention, memory and/or motor skills. In one embodiment of the present invention, the system may incorporate a game or gaming platform. In another embodiment of the present invention, the system may be operable by children, for example, such as children between the ages of 3 and 6 and the system may further be operable to provide the training and rewards to a user.

Figure 3:
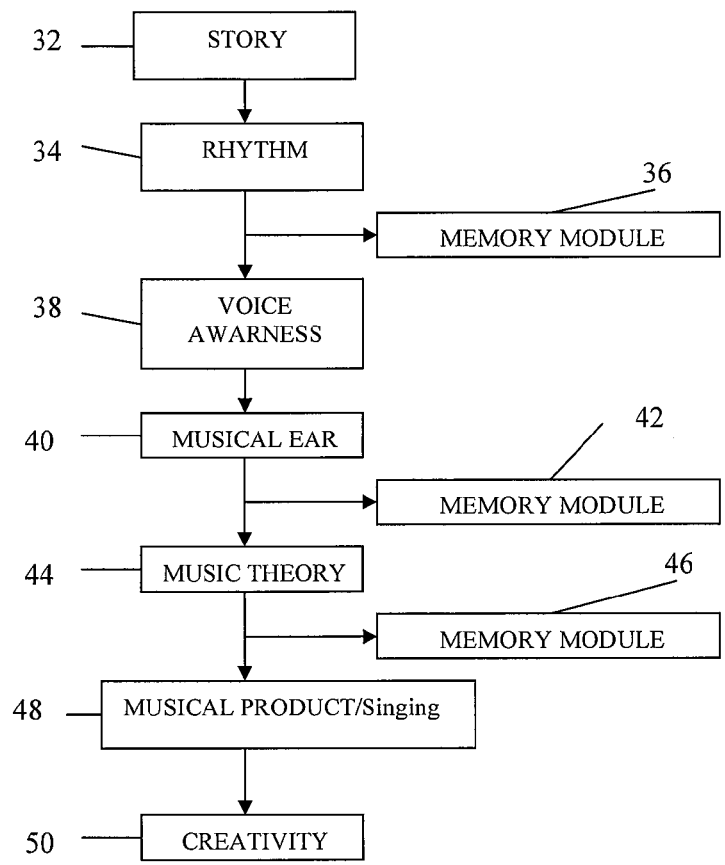
FIG. 3 is a flow chart showing how the computer program is running during a training session and in what section order.

The present invention may involve various organization of exercises, sessions, lessons and modules. As shown in FIG. 3, sessions may be organized and ordered to begin with a story module 32. It may be possible for sessions to begin with various modules, and for various numbers of sessions to begin with various modules. For example, in an embodiment of the present invention the first three sessions may begin with a story module.

A story module of the present invention may be operable to assist the user to understand the objectives of the exercises, lessons and/or modules of the present invention, for example, such as to understand the objectives of an exercise that is a game.

In one embodiment of the present invention, a game may start at a specific level and environment, for example, such as the pond level. While playing the game, the user may be required to successfully reach another level and/or environment, for example, such as the theatre stage level. Levels may progress in difficultly from a beginning level to a final level. However, a user may not be required necessarily to start at a beginning level, which may be the easiest level, when starting a session. A user may be able to start at a higher level depending on any performance analysis corresponding to the user. So if a performance analysis, such as, for example a performance analysis of a user's prior experience using the present invention, indicates that the user's performance level is at a level beyond the easiest level, then the user may begin a session at a level of greater difficulty than the easiest level. The present invention may also or alternatively include a skills assessment exercise or module that is presented to a first-time user of the present invention. The skills assessment exercise or module may be utilized to determine a user's skill level and a user may begin the session at an exercise, module or lesson appropriate to the user's skill level. In some embodiments of the present invention it may be possible for a user to choose an exercise, module or lesson level to begin to utilize the present invention. The present invention may assess and analyze the user's use of the present invention during an exercise, lesson or module and may determine the level of the next exercise, lesson or module presented to the user in accordance with the information collected about the user's performance. The next exercise, lesson or module presented to a user may be of a more or less difficult level based upon this assessment and analysis.

If a user is directed to, or chooses, a story module, different characters that the user will meet during the game may be presented to the user. This presentation may further explain the relationship between the character and particular musical notes, as well as musical scale concepts. The story module may be the beginning of the cognitive skill training. Through the story module the user may participate in their first singing lesson.

The session may continue with a rhythm exercise 34. This type of exercise may also begin each lesson after the third exercise, as described herein. The rhythm exercise 34 may teach rhythm skills to a user, and may further cause a user to become involved in the lesson. The rhythm exercise may involve significant amounts of motor movement, whole body coordination and a may offer a entertainment to the user. At the end of the rhythm exercise, a memory module 36 may pose three questions related to the rhythm exercise to the user. A user may utilize an input means to respond to the questions. The response may be an oral, written, motion or any other response. The input means may be utilized by a user to provide any responses required by the present invention. The present invention may calculate the number of correct responses to the questions posed to the user and may further produce a result that is a comparison of correct responses provided to the total number of possible correct responses.

The present invention may further present a voice awareness exercise 38 to a user. The voice awareness exercise may be designed to warm the voice of the user. The voice awareness exercise may have a similar entertainment value as the rhythm exercise, but may involve a lower level of motor skill requirements. Therefore, the degree of attention required by the user may be higher in the voice awareness exercise than the rhythm exercise.

The present invention may also present a musical ear exercise 40 to the user. The musical ear exercise 40 may require a higher level of user attention than other exercises. The musical ear exercise may train a user to attain hearing discrimination skills. At the end of the musical ear exercise, a memory module 42 may pose three questions related to the musical ear exercise to the user.

The program may also present music theory exercises 44 to a user. Music theory exercises may be the most difficult exercise and may demand the highest level of attention compared to all other exercises in the program. The music theory exercises may also require the user to sustain his or her attention for a longer duration than is required by the user while undertaking the other program exercises. The music theory exercises may introduce difficult concepts and a large amounts of new knowledge to the user. At the end of these exercises, a memory module 46 may pose three questions related to the music theory exercises 44 to the user.

The present invention may also launch a musical product exercise 48 and then a creativity exercise 50. These types of exercises may be placed at the end of the training session because they are playful and enjoyable. The musical produce and creativity exercises may each be perceived by a user as rewards. The musical product exercises may teach the user how to sing and train him to memorize linguistic lyrics. The quantity and the difficulty of the lyrics may increase with the level of difficulty of the particular exercise, which may progress through a session. The session may also include, and may finish with, a creativity exercise. The creativity exercises may be highly entertaining for a user. The creativity exercises may correspond to a reward time and a period of time during which the user may express and use the knowledge learned through the session and the training generally.

Figure 4:
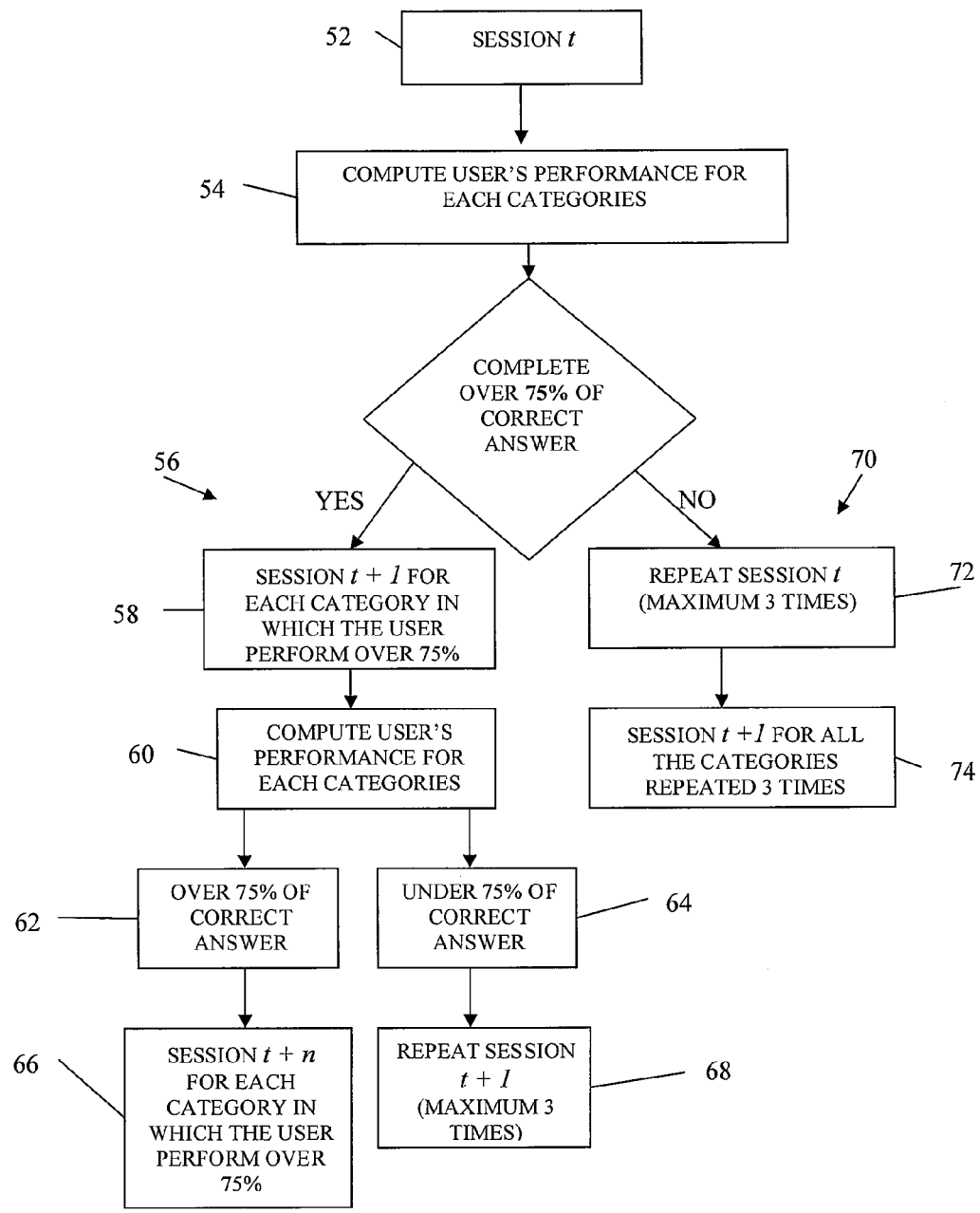
FIG. 4 is a flow chart showing how the development of the curriculum of the present invention is controlled by a tracking progress module using user performance.

In one embodiment of the present invention, the curriculum of training, that includes the exercises, lessons, modules, etc. of the present invention, may be controlled by a tracking progress module. As shown in FIG. 4, the functioning of the curriculum may be based on performance and number of trials. For example, after session t 52 the tracking progress module may compute or analyze the user's performance. As an example, the user's performance may include information relating to a user's reaction time and success rate for each category 54. The success rate may be indicated at least in part by the correct answers to questions posed to the user.

Should the user's performance be computed or analyzed as reaching a percentage that is 75% performance rate or above 56, the tracking progress module may launch the session t+1 58. The performance percentage, or other performance measure, may represent a performance rate target, or an exercise result. Recognizing that a user has reached or exceeded the performance rate target may represent a determination by the present invention that the user may be presented with exercises, modules or lessons that are more difficult than the previous exercises, modules or lessons provided to the user. The determination that a user has achieved a performance that is less than the performance rate target may be interpreted as a user having failed, whereas the determination that user has achieved a performance that is more than the performance rate target may be interpreted as a user having passed.

After the session t+1, the tracking progress module may compute the user's performance for each category in session t+1 60, in a manner that is described herein. At this point, two cases may be possible, over or equal to 75% of correct answer 62 or fewer than 75% of correct answer 64.

Should a user's performance be computed or analyzed to be over or equal to a 75% performance rate 62, the tracking progress module may launch the session t+2 66. In this manner a user may be presented with exercises, modules or lessons of a higher level of difficulty. Alternatively, when the user's performance is fewer than 75% of correct answer 64, the tracking progress module may launch again the same session t+1 68. In this manner a user may repeat the same exercises, modules or lessons multiple times until a user's performance success art reaches a level whereby a user is permitted to be presented with exercises, modules or lessons at to a higher level of difficulty, or until the present invention determines that a user may be presented with exercises, modules or lesson at a higher level of difficulty for another reason, for example, such as exceeding a set number of repetitions of an exercise, module or lesson allowed by the present invention. As an example, if the user's performance reached less than a 75% performance rate 70, the computer may re-launch the session t 72. This possibility can be repeated 2 times, so that a maximum of 3 repetitions of the same session 72 occurs before a user is presented with the session t+1 74, which is of a higher difficulty level.

The information collected by the present invention while a user utilizes the present invention and undertakes exercises, modules and lessons, may be the score of correct activities and/or answers to questions posed to a user, as well as the time that a user takes to complete an exercise. This information may be collected for each level of each exercise and for each type of exercise. The score and time may also be collected for each lesson and/or module or other grouping of exercises. For example, a lesson may include several exercises that are at the same levels. Time may also be collected for time spent undertaking non-exercise activities, total time spent utilizing the present invention, or time spent on each exercise, module or lesson. The level of each exercise, module or lesson may also be collected.

In one embodiment of the present invention, the performance rate that must be met for a user to be presented with an exercise, lesson or module of increased difficulty may not change. For example, if the performance rate is set to 75% percent, this will remain the mark that must be met by a user's performance consistently for all exercises, lessons and modules during a session. The level of difficulty of the exercises, modules and lessons presented to a user may change during a session, to increase or decrease in accordance with a user's analyzed performance level, as described herein. For example, an exercise of a level of increased difficulty may include more complex rhythms or melodies. In some embodiments of the present invention an authorized controller of the present invention may be permitted to modify the performance rate mark that must be met by a user's performance for individual exercises, modules, or lessons.

Figure 5:
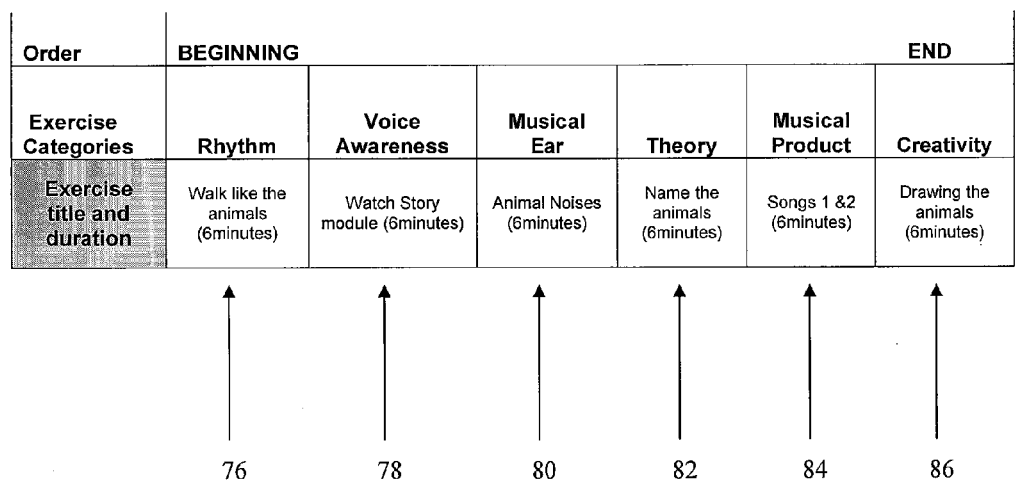
FIG. 5 is a table representing the different exercise sections involved in the training program of the present invention. This table also shows a lesson example with different exercise from each section and their duration.

A variety of types of exercises may be included in the present invention. For example, as shown in FIG. 5, there may be six types of exercises in the present invention: Rhythm 76, Voice awareness 78, Musical ear 80, theory 82, Musical product 84 and Creativity 86. The sequence and duration of each may be set for an exercise during a module, lesson or session. Each exercise may last a similar span of time, for example, such as between 5 to 10 minutes. The time may vary in accordance with user choices, for example, such as the choice by a user to repeat the game instructions, or other choices.

As an example, the rhythm exercise 76 may involve the user learning the basic principle of music rhythm, for example, such as rhythm perception, discrimination and production. In a voice awareness 78 exercise, a user may learn his vocal range, voice volume, scooping voice and vocal ornamentations using simple movements and voice mime. In a musical ear 80 exercise, user may learn musical notes, for example, such as C4 to C5, the user may further learn to discriminate the notes and to produce the notes. In a theory 82 exercise, a user may learn basic principal and knowledge in music such as musical staff and relationship between musical notes. In a musical product 84 exercise, a user may learn, melody, songs and how singing properly. In a creativity section 86 exercise, a user may learn how to use the concept and new knowledge he just learned in other exercises to produce music. The exercise may be presented to a user in the order in which they are listed herein, or in some other order. The order of the exercises may be chosen to best facilitate learning for a particular user.

The duration of exercises may vary. In one embodiment of the present invention the duration of exercises may be consistent for groups of exercises, for example, such as groups of exercises included in particular lessons, modules or sessions. As shown in FIG. 5, the duration of each type of exercise may be a consistent period of time that is 6 minutes. The duration of the exercise include the time for the instructions and the exercise activities.

Figure 6:
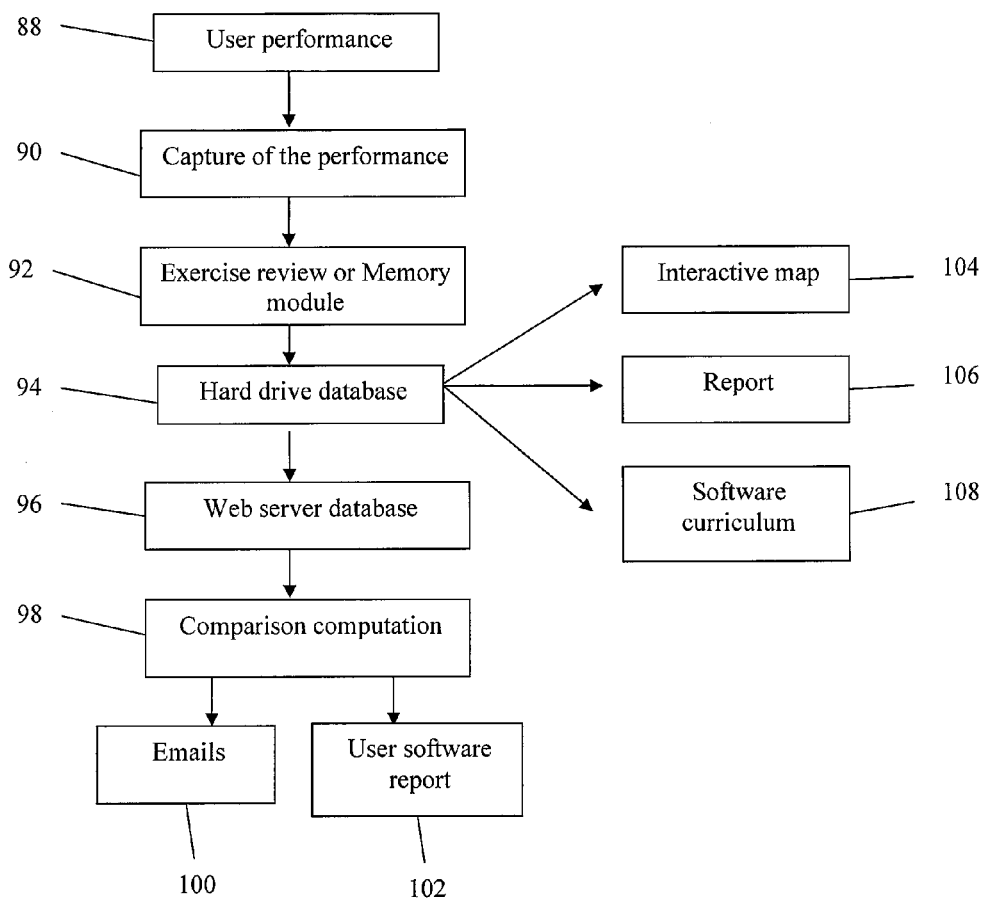
FIG. 6 is a flow chart showing how the tracking progress module is running and how the training data are transferred, used and stored.

A skilled reader will recognize that a variety of types of information may be gathered relating to a user's use of the present invention. As described herein, some of this information may be utilized to analyze a user's performance and determine a user's skill level. This analysis may involve scoring, calculating or other activities to arrive at a rate of performance that marks whether a user will be presented with a more difficult exercise, a less difficult exercise, or an exercise at the same level of difficulty, as described herein. As shown in FIG. 6, a score may be collected by a module of the present invention, such as a tracking progress module. User performance information 88 may be collected by a user's interaction with any input means, for example, such as a mouse, keyboard, joystick, or any other input means. A performance score may be computed 90 and the memory module may be launched 92. The memory module may pose questions to the user and the user's response to the questions may be captured by the present invention. The information collected by the present invention may be stored to a data storage means, for example, such as a database 94.

The present invention may further utilize monitoring means to monitor the interaction of the user with the present invention. For example, such monitoring means may include any of the following: a webcam; a keyboard; a computer mouse; a specially designed electronic glove; a sensor; or any other monitoring means.

The present invention may utilize the information collected by, and the data generated by, the present invention in a variety of ways. For example, in one embodiment of the present invention the information and/or data may be utilized in four different ways.

One way that the information and/or data may be utilized 96, is that the present invention may send the information and/or data stored in the data storage means to a web server database 96. The web server may compute a comparison between user data and a database 98 that includes information relating to skills of humans generally. The results of this process may be sent through an email 100 to the user and back to the present invention in the form of a user report 102. The user report may be presented to the user by the present invention as feedback. The report may provide the user with an indication of the user's performance as compared to the skills of other humans, for example, such as other humans sharing characteristics with the user, such as age or other characteristics.

Figure 31:
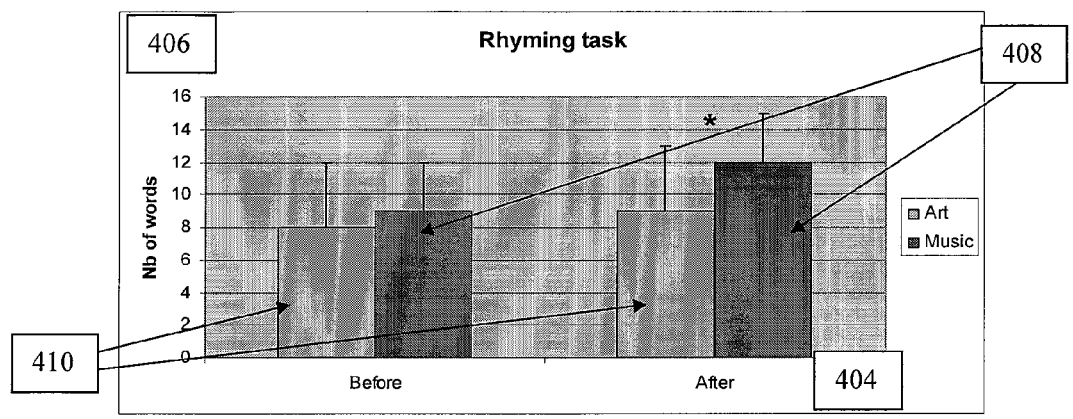
FIG. 31 is a graphical representation of the study results of the present invention showing the rhyming score of the method of the present invention and the control groups before and after training.

Another way that the information and/or data may be utilized, is that the present invention may send the data and/or information stored on the data storage means to an interactive map module 104, as shown in FIG. 31. The interactive map module may generate a map indicating the level of the user's performance.

Another way that the information and/or data may be utilized, is that the present invention may use the data and/or information stored on data storage means to produce a session report 106. The session report may be provided to the user in a variety of means as feedback.

Another way that the information and/or data may be utilized, is that the present invention may send the data and/or information stored on the data storage means to adapt software curriculum 108 to user performance. In this manner the present invention may develop an order of exercises, lessons and/or modules that may be presented to the user, so as to train the user to improve the user's skills. The order of exercises, lessons and/or modules may be tailored to specifically meet the needs of the user. The needs of the user may be indicated by the information and/or data corresponding to the user, and the analysis or other review of this data may provide support for the ordering of the exercises, lessons and/or modules presented to the user.

Figure 7:
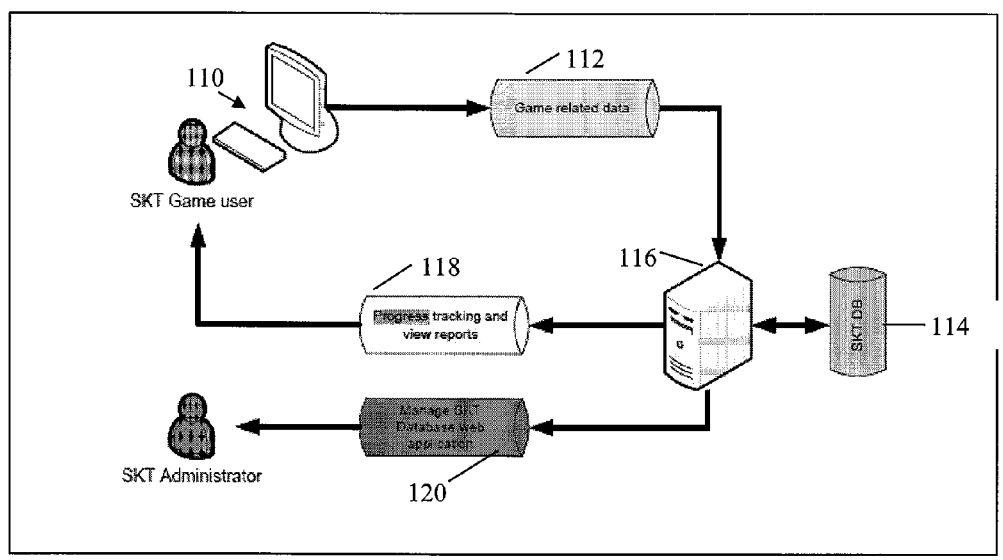
FIG. 7 is a flow chart showing how the tracking progress module is running the relationship between a web server and user data.

A skilled reader will recognize the variety of training platforms that may be presented to users by the present invention. An example is shown in FIG. 7, wherein a user, Smarterkids Training (SKT) game user, may use the present invention to enhance his intelligence, attention span, language skills and brain function. The present invention may offer interactive training to the user through a computer program 110. The computer program may be a computer program product, and may offer the training in a variety of formats, for example, such as a game, an interactive story, or any other program format. The format of the present invention may be presented on a platform or device suitable to the format, for example, such as an interactive story provided on an interactive book device, a game presented on a gaming console, etc.

The present invention may include an input means, for example, such as a mouse and/or keyboard, as shown in FIG. 7. The mouse and keyboard may be utilized to allow the user to communicate with the present invention. The mouse and keyboard may capture the user's input 112. Such user input may be stored as input data in the computer 116, any other device utilized by the present invention, or in any data storage means, including any data storage means that is remote from but connected to the present invention.

The present invention may generate and provide a variety of types of feedback and/or reports, for example, such as progress reports, to the user 118. Feedback and/or reports may also be provided to a controller, such as a clinician or system administrator. As shown in FIG. 7, feedback may be provided to an SKT administrator who is a clinical institution employee. Feedback or reports may be provided through a variety of means, for example, such as through a web application 120 to a web server or database 114, to any email addresses, to a printer, or to another data storage means in which the user's data may be saved. The present invention may translate the user's data and/or information into performance, evaluation and progress reports named. As shown in FIG. 7, such reports may be categorized and/or named, for example, such as "Progress Tracking System" reports.

Figure 8:
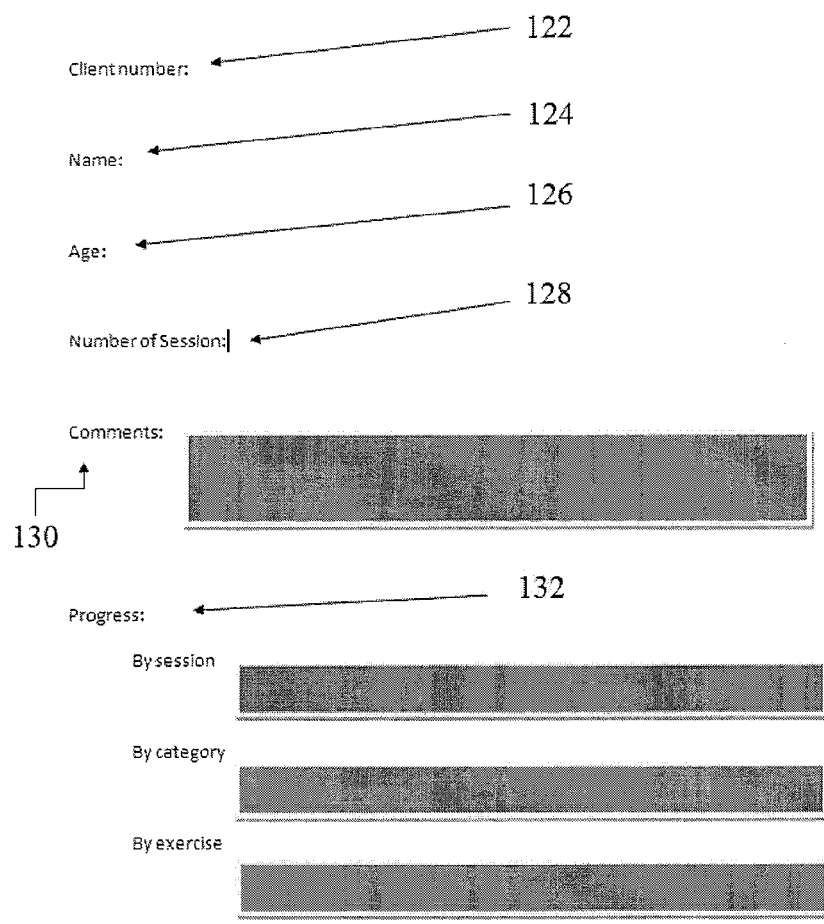
FIG. 8 is a pictorial representation of the first page report from the tracking progress module report.

An example of one report that the present invention may generate is shown in FIG. 8, which shows the first page of a report produced by the tracking progress module of the present invention. This report may contain personal user information such as client number 122, name 124, age 126, and can also display other personal information relating to the user. The report may also provide a section for comments 130 which may be completed by the user, clinicians, therapists, parents, or other parties. The report may also display a progress update 132 by session, by category and by exercise. A skilled reader will recognize the variety of types of reports as well as types of information that may be included in such reports, that the present invention may generate.

Figure 9:
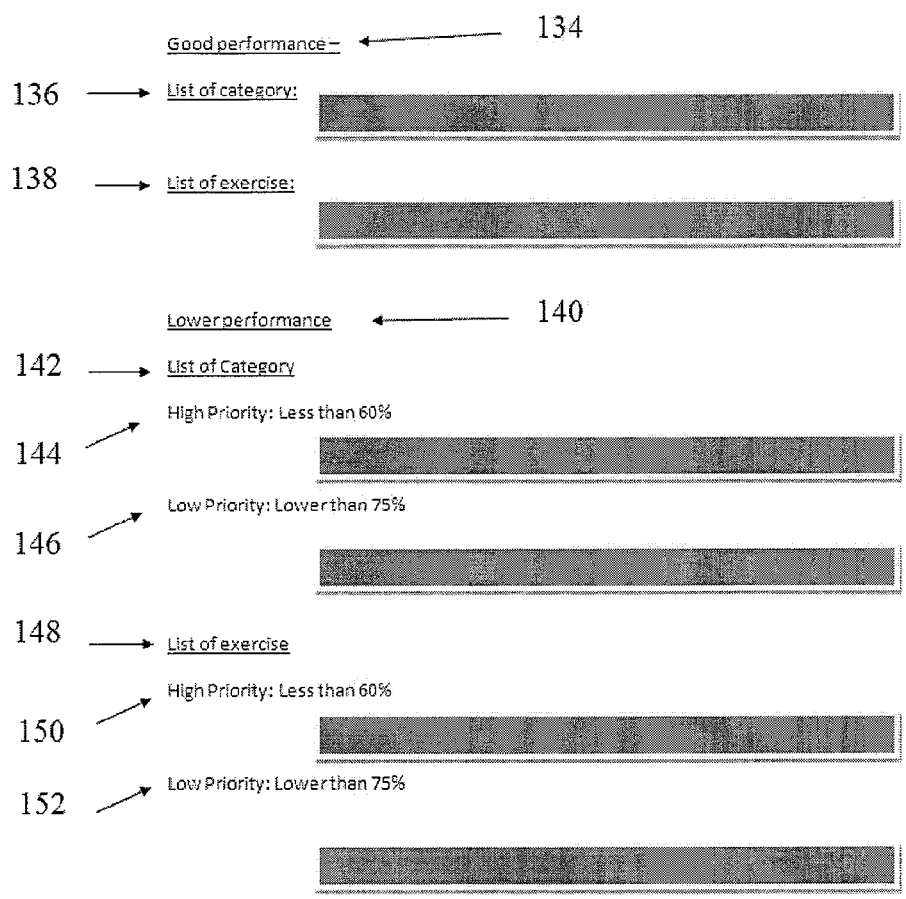
FIG. 9 is a pictorial representation of the second page report from the tracking progress module report.

An example of a second page of the report shown in FIG. 8 is presented in FIG. 9. This second page includes information relating to the range of performance of the user from successful performance 134 to the lower level performance 140. Good performance 134 may be reported in two categories: a list of categories 136 in which the user will find the user performance, broken down by category; and a list of exercises 138 in which the user will find the user performance, broken down by exercise.

The lower performance 140 part of this page may be provided to help the user to know which categories 142 and exercises 148 he has to work on.

For list of categories 142, this section may display high priority categories 144: being one or more categories in which the user obtains less than a 60% performance rate; and low priority categories 146: one or more categories in which the user obtains less than a 75% performance rate.

For list of exercises 148, this section may display high priority exercises 150: being one or more exercises in which the user obtains less than a 60% performance rate; and low priority exercises 152: being one or more exercise in which the user obtains less than a 75% performance rate.

Figure 10:
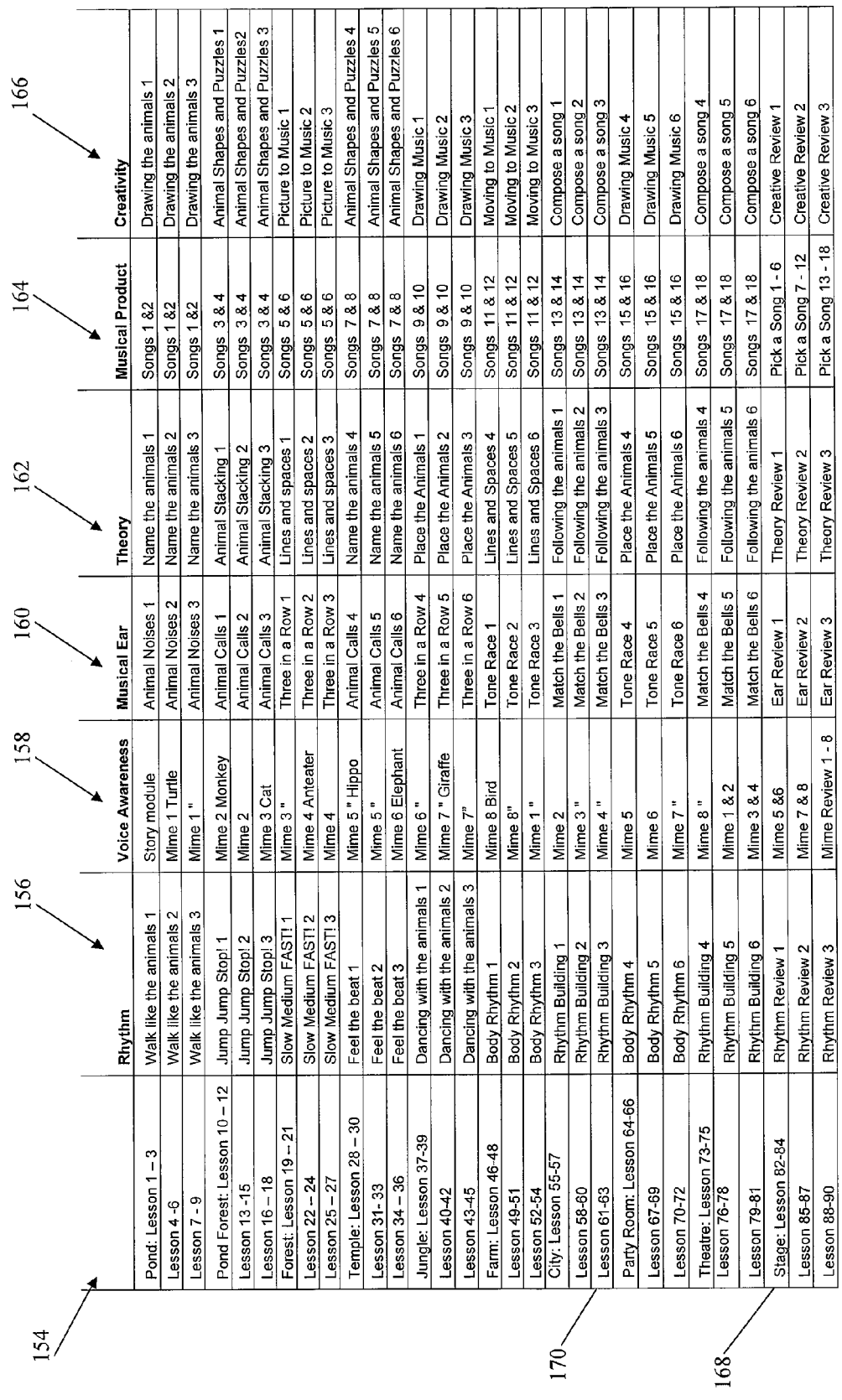
FIG. 10 is a table describing the curriculum mode 90 session/lesson breakdown with all exercise section: rhythm, voice awareness, musical ear, music theory, musical product, creativity; and the order of presentation.

In a preferred embodiment of the present invention, the curriculum may be organized in 90 sessions, as shown in FIG. 10. The succession of the training session exercises 154 may be by category, and the training session exercises may include: rhythm 156; voice awareness 158; musical ear 160; theory 162; musical product 164; and creativity 166. By showing the lesson/exercise session breakdown, every lesson/exercise session may be reviewed by exercise.

All exercises of the curriculum are in Table 2 170. Table 2 170 further shows the stage of the curriculum at which the review module begins 168, lesson/exercise session numbered 82.

Figure 11:
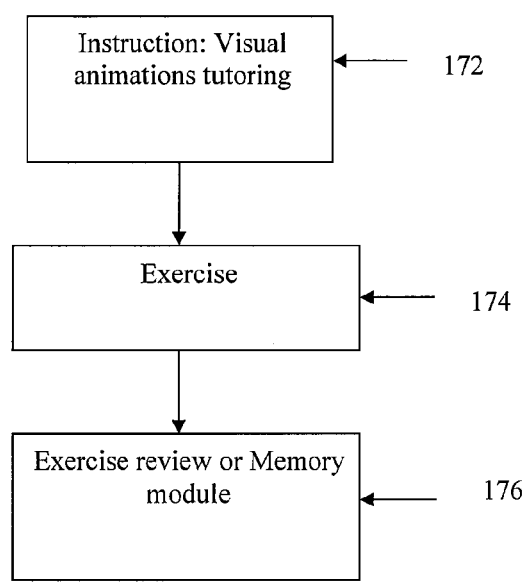
FIG. 11 is a flow chart showing at which stage of the exercise the computer program is running the memory module.

The present invention may include a memory module operable to train the memory skills of a user, and to assess the memory skills of a user in relation to particular musical training skills. As shown in FIG. 11, the memory module may be operable at particular stages in an exercise, lesson or module. The present invention may present an exercise to a user, and the exercise may begin by instructions 172 being provided to the user. The exercise activities 174 may follow the instructions. As the exercise comes to an end 174, the memory module 176, or an exercise review, may be applied by the present invention. The application of the memory module 176 may involve the present invention posing one or more questions to a user. The question may be about what the user learned during the exercise 174. The memory module may activate the verbal memory brain network of the user and reinforce the knowledge the user learned during the exercise.

Figure 12:
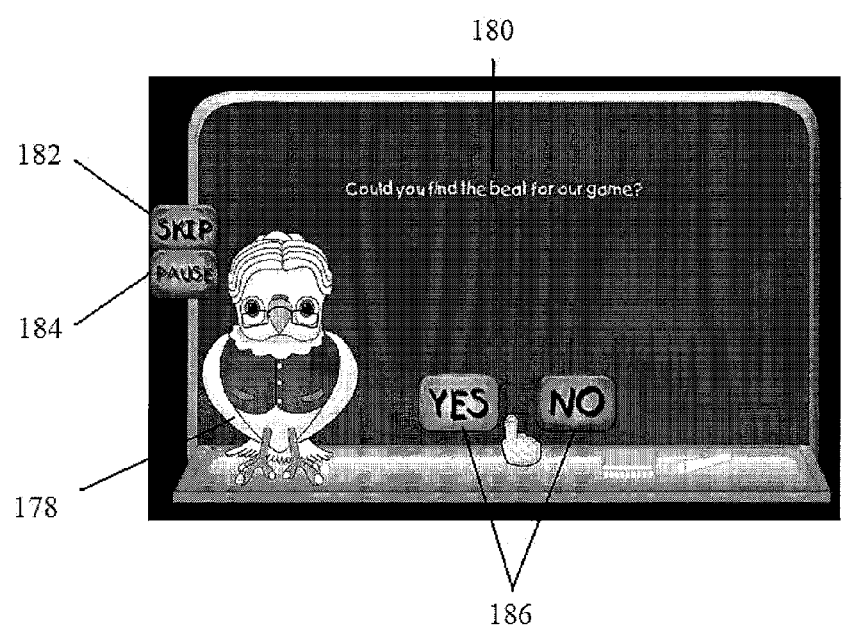
FIG. 12 is a pictorial representation of a memory module game screen.

Embodiments of the present invention may involve pictorial representations. As an example pictorial representations may be included in the present invention that is presented as a game. In particular, the pictorial representations may be part of an application of the memory module as it is presented in a game screen. As shown in FIG. 12, several elements may be present in a pictorial representation, including one or more animal characters 178. The one or more animal characters may appear on one of the side of the screen. A written question 180 may also be present in a game screen, and a question may appear at the top of the screen. One or more buttons may also be included in a pictorial representation, and such buttons may be presented on one side of the screen. The buttons may be utilized by a user to navigate in the present invention and to provide input to the present invention. For example buttons presented to a user may include a "SKIP" button 182, a "PAUSE" button 184, and one or more response buttons 186, for example, such as a "YES" response button and a "NO" response button. The buttons may appear at any position on the screen, for example, such as at the bottom of the screen. The response buttons may be utilized by a user to respond to questions posed by the memory module, or to provide other inputs to the present invention.

In one embodiment of the present invention, one or more animal characters may be animated to read a question to the user. In such an embodiment the question may be posed to a user in both oral and written format, or in only oral format. A skilled reader will recognize the variety of elements, and the multitude of placement options for such elements, that may be part of a game screen, or other pictorial representation that is provided by the present invention.

Figure 13:
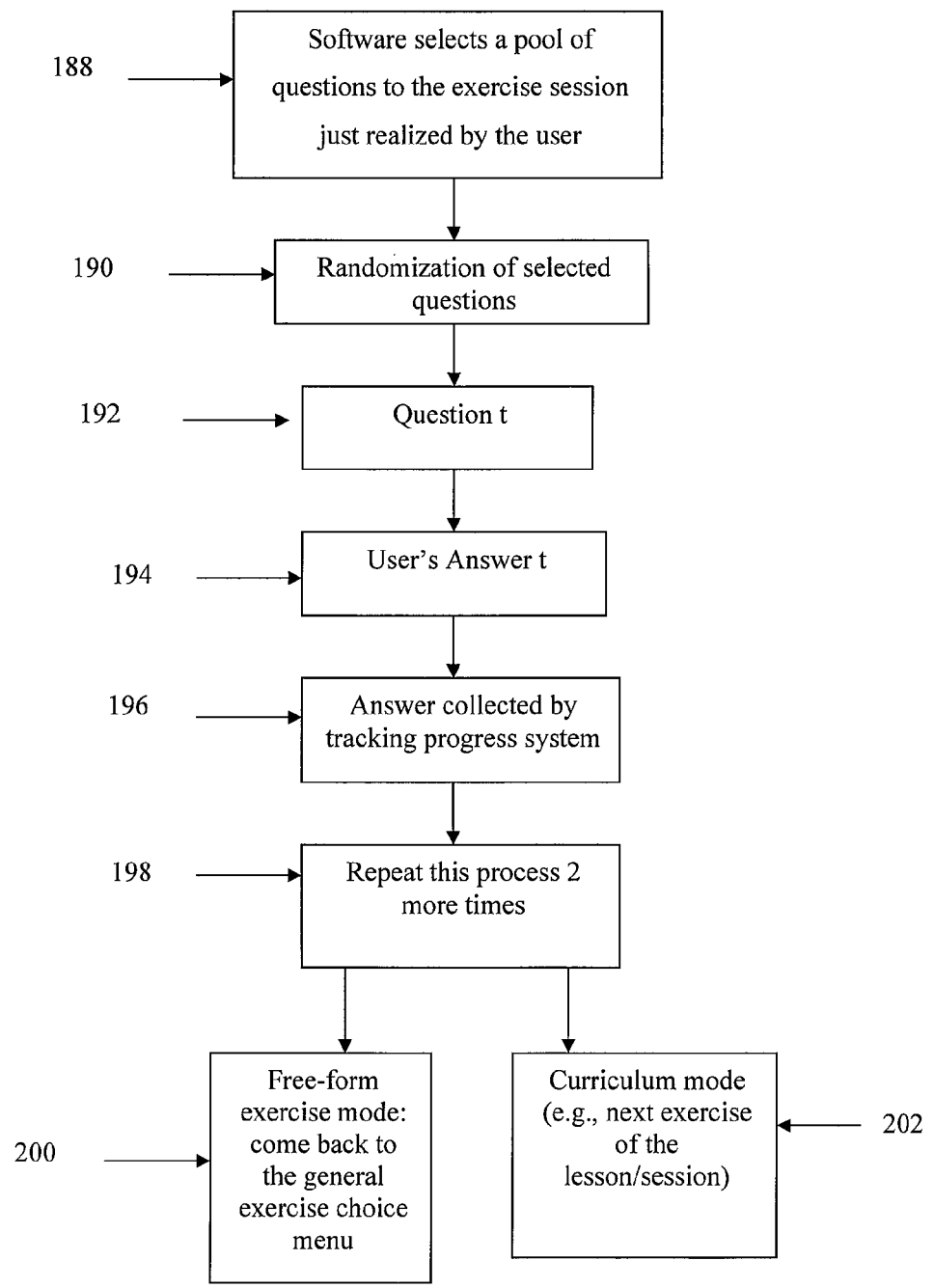
FIG. 13 is a flow chart showing how the memory module is running.

In another embodiment of the present invention, as shown in FIG. 13, the memory module may be operable to undertake one or more steps. The memory module may select one or more questions from a pool of questions related to a specific exercise that has been undertake by a user 188. The present invention may access the pool of questions that may be incorporated in the present invention or may be stored in a data storage means, which may be a local or a remote data storage means. The memory module may randomize the selected questions 190. Each question may be posed to the user, for example, a first questions may be posed to the user as t 192. The user may respond to the question t 194, and the response may be collected by the tracking progress system of the present invention, or any other analysis module. The memory module may repeat the process of posing questions to the user multiple times, for example, such as two more times 198 for a total of three questions/answers. After the user responses to the questions have been inputted by the user, the memory module may provide the user with a general exercise choice menu 200, for example, such as a free-form exercise mode, or the memory module may provide a user with a subsequent exercise 202, for example, such as an exercise from the curriculum mode of the present invention. The curriculum mode may represent the exercises in a lesson, module or combination of lessons and modules, such as lessons, modules or combinations thereof that are tailored for the specific user.

The memory module may further be operable to evaluate the knowledge or skill of a user. The memory module may utilize the user responses and other information and/or data collected by the present invention, for example, such as the time that a user took to complete an exercise, to analyze, or otherwise evaluate the knowledge or skill of a user. The responses in particular may be evaluated by the memory module to determine the number of correct responses provided by the user to the questions posed to the user. The memory module may also, or alternatively, transfer response information to another analysis module of the present invention for that module to undertake an analysis of the performance rate of the user. The memory module may further be operable to include elements that may help to remind the user about the crucial elements of particular exercises.

Figure 14:
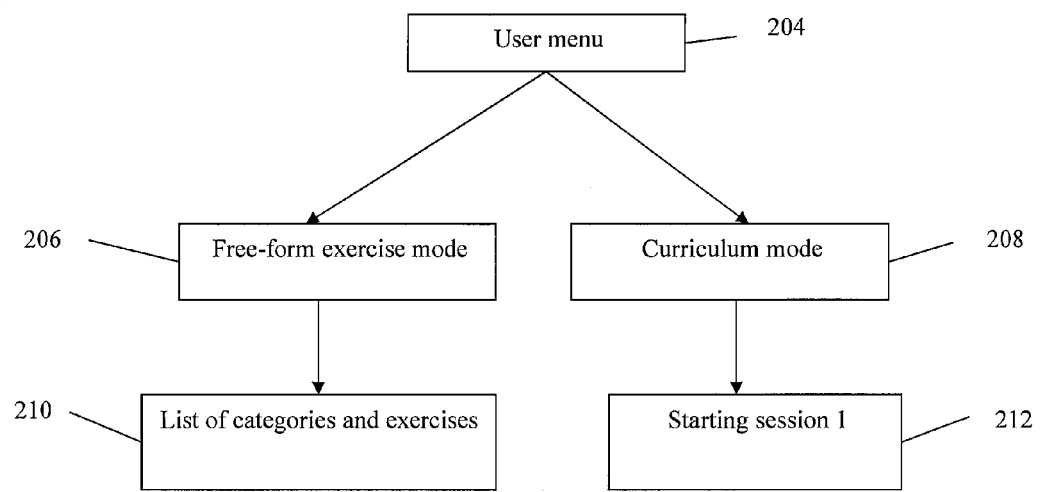
FIG. 14 is a flow chart showing how the computer program is offering two ways of using the curriculum of the present invention: exercise choice and curriculum according to the present invention.

The present invention may offer users a variety of modes of use. For example, as shown in FIG. 14, a user menu 204 may offer users two modes of use, for example, such as a free-form exercise mode 206, and a curriculum mode 208. The free-form exercise mode 206, may be operable to allow users to access and practice any of the exercises of the present invention. The exercises may be presented to the user in a list so that the user may utilize the input means to choose an exercise from the list 210. The curriculum mode may represent a set of exercises, lessons and/or modules. Users may be guided through the program, for example, such as by an exercise manager element of the present invention. A user may be provided by the present invention with a starting session 212. In the curriculum mode users may be limited as to what exercises they are allowed to choose. The curriculum mode may utilize data and other information collected by the present invention to adapts the exercises, lessons, and/or modules to the performance level of a user and more generally to the skills the users. In this manner the curriculum presented to the user may be tailored to the user.

At least two different modes may be provided to a user by the present invention since the teaching professional, training professional, or clinician, working with the user to improve the user's skills and performance may want to have options to adjust the training provided to the user by the present invention. For example, the clinician may want to increase the amount of training on chosen exercises to address the user's needs, or may want to leave the patient experience the rehabilitation program by himself/herself. For this reason the present invention may offer options regarding the curriculum it offers. For example, a clinician who is a controller, or a system administrator, may be able to cause the present invention to provide a specific curriculum. Alternatively, the present invention may allow for the total number of lessons to be defined by user performance. The present invention may also include a standard training program for users. For example, a standard training program may include sets of exercises grouped into lessons, for example, such as grouping of exercises that result in 90 different lessons. The exercises may be provided to a user and repeated as necessary to train a user.

Figure 15:
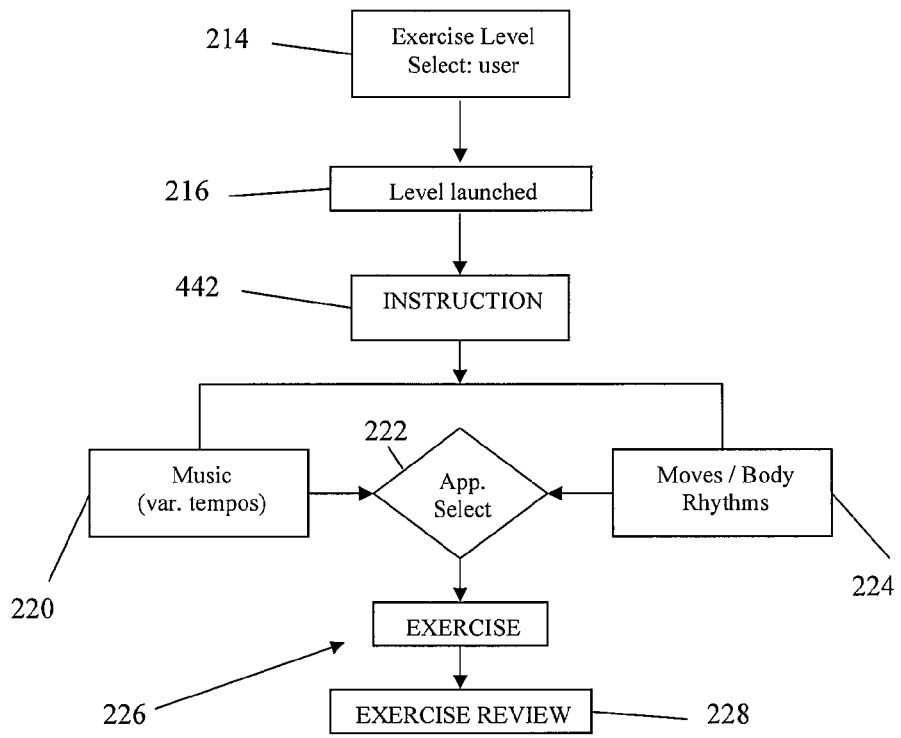
FIG. 15 is a flow chart showing how the computer program is running the Rhythm Exercises section.

As an example, a possible embodiment of the present invention for offering a rhythm exercise is shown in FIG. 15. The user or the curriculum mode may choose the exercise level 214 that is appropriate to the user, as described herein. The present invention may initiate an exercise at the appropriate level 216, which may involve instructions 218 being provided to a user. The present invention may randomly 222 assign sound 220 and moves and/or body rhythms 224 to an animal character. While undertaking the exercise activities, the user may be required to reproduce the moves of the animal character corresponding to a specific rhythm 226. The present invention may initiate a memory module as a form of exercise review 228, whereby a set of questions relating to the exercise are posed to the user at the end of the exercise.

Figure 16:
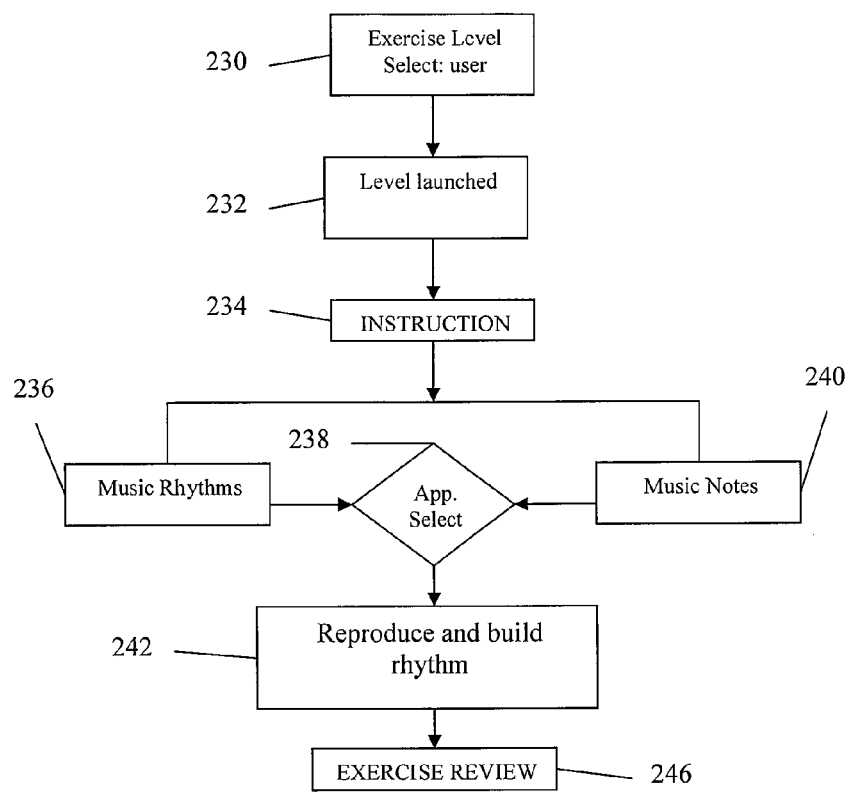
FIG. 16 is a flow chart showing how the computer program is running the Rhythm Exercise—Rhythm Building.

As another example, a possible embodiment of the present invention offering a rhythm production exercise is shown at FIG. 16. The user or the curriculum mode may select an exercise level 230 appropriate to the user. The present invention may initiate an exercise at the level 232 chosen as appropriate to the user, and the present invention may provide instructions 234 relating to the exercise to the user. The present invention may randomly 238 assign rhythm 236 and musical notes 240 to musical staff frame. The user may be required to build and reproduce a specific rhythm 242 in the course of the exercise activities. The present invention may initiate the memory module as a form of exercise review 244, whereby a set of questions relating to the exercise are posed to the user at the end of the exercise.

Figure 17:
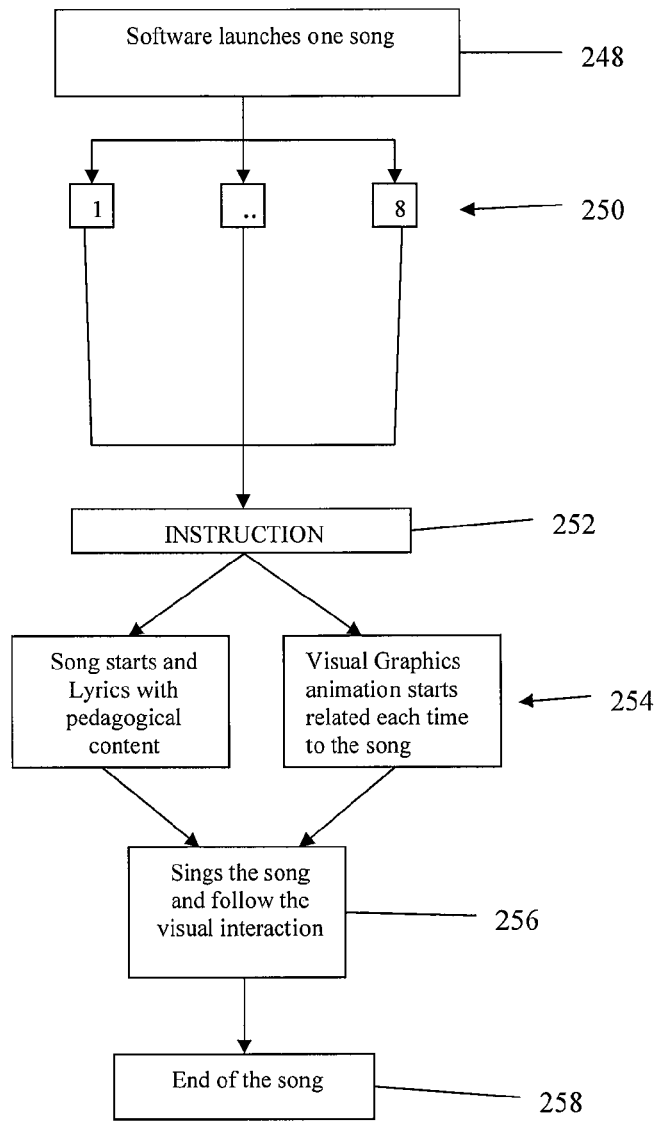
FIG. 17 is a flow chart showing how the computer program is running the Voice Awareness Exercises.

As yet another example, the present invention may include a voice awareness exercise that may possibly be operable in the manner shown in FIG. 17. The user or the curriculum mode may initiate a song 248 that corresponds to a difficulty level 250 that is chosen to be appropriate to a user. The present invention may provide instructions 252 relating to the exercise to the user. The songs may involve a mixture of lyrics, pedagogical content and visual graphics animation 254 as they are played to a user. The user may warm his voice and explore all the sound possibilities of his voice 256 in the course of the exercise. The exercise may finish at the end of the song 258.

Figure 18:
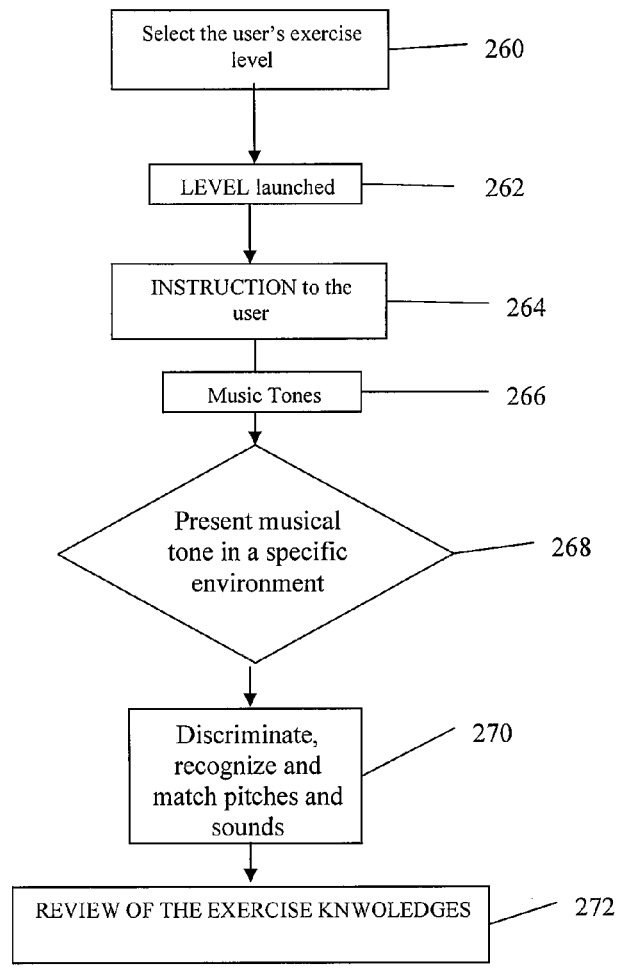
FIG. 18 is a flow chart showing how the computer program is running the Musical Ear Exercises.
Figure 19:
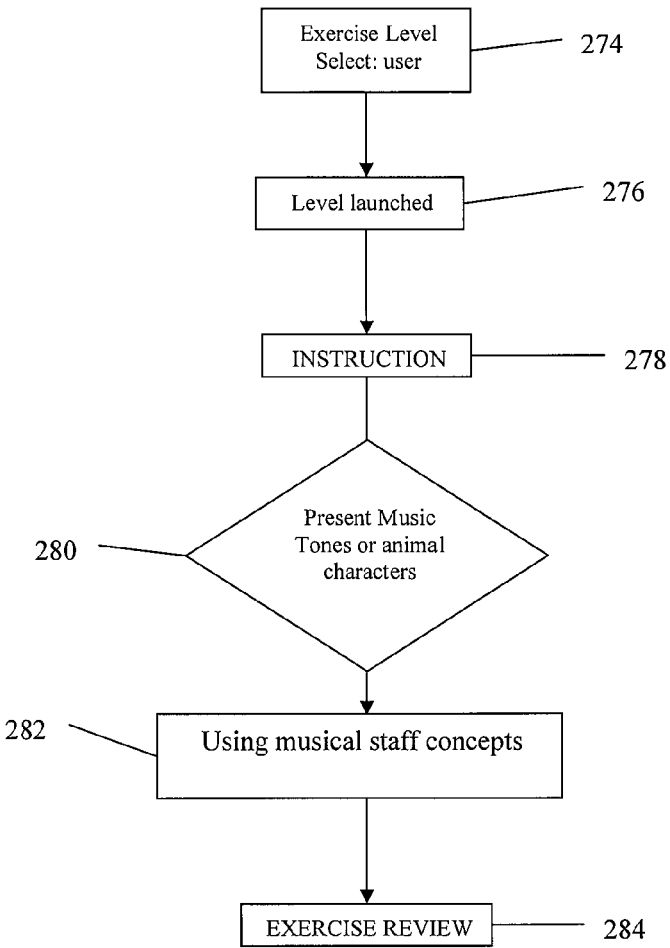
FIG. 19 is a flow chart showing how the computer program is running the Theory Exercises.

As still another example, the present invention may include a musical ear exercise that may possible by operable in the manner shown in FIG. 18. The user or the curriculum mode may select the exercise level 260 as appropriate to the user. The present invention may initiate the exercise at the level 262 appropriate to the user. The present invention may provide instructions 264 to the user. The present invention may randomly pick and present a musical tone 266 in a specific environment that is related to the level of difficulty 268 of the exercise. In this manner different environments may be presented for musical tones at different levels of difficulty. The user may discriminate and recognize musical tones in the course of the exercise. The user may match pitches and sounds with each of the animal characters 270 as exercise activities. The present invention may initiate the memory module as a form of exercise review 272, whereby a set of questions relating to the exercise are posed to the user at the end of the exercise.

Figure 20:
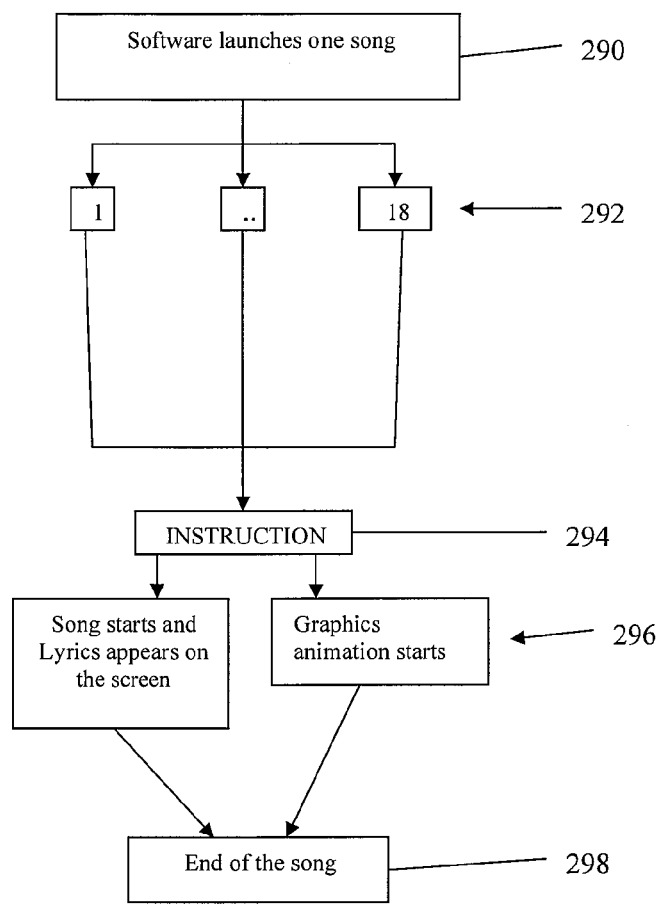
FIG. 20 is a flow chart showing how the computer program is running the Musical Product Exercises.

As another example, the present invention may include theory exercises that may possible be presented to a user in the manner shown in FIG. 20. The user or the curriculum mode may choose the exercise level 274 appropriate to the user. The present invention may initiate the exercise at the level 276 that is appropriate to the user. The present invention may provide instructions 278 to the user. The present invention may randomly pick and present musical tones or animal characters 280 to the user in the course of the exercise. The user may discriminate and recognize musical tone or animal characters. The user may match the musical tones and/or animal characters with the musical staff 282 presented to the user by the present invention. The present invention may initiate the memory module as a form of exercise review 284, whereby a set of questions relating to the exercise are posed to the user at the end of the exercise.

Figure 21:
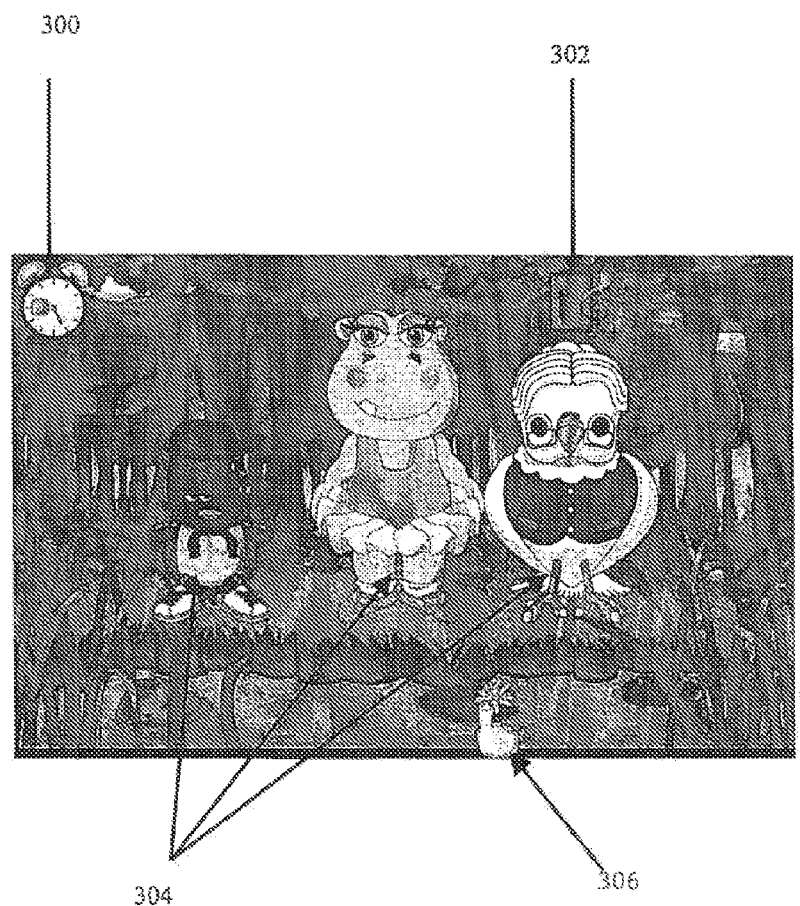
FIG. 21 is a pictorial representation of a game screen in the forest environment in which user have to make the choice between three animal's sounds according to the present invention.

In one embodiment the present invention may be presented to a user as a game. The game may include multiple game screens, for example, such as the game screen shown in FIG. 21. Common elements for exercises may appear on a game screen. A clock 300 may be presented in the screen, for example, such as in a corner of the screen. The clock may tracks the time of a given exercise. A point scale 302 may be provided in the game screen, for example, such as in another corner of the screen. A pointer 306 may be provided in the screen to help the user to navigate on the screen. Animal character buttons 304 may be provided in the screen, which may be utilized by a user to provide input or other responses to the present invention, as part of an exercise or another process of the present invention, as described herein.

Figure 22:
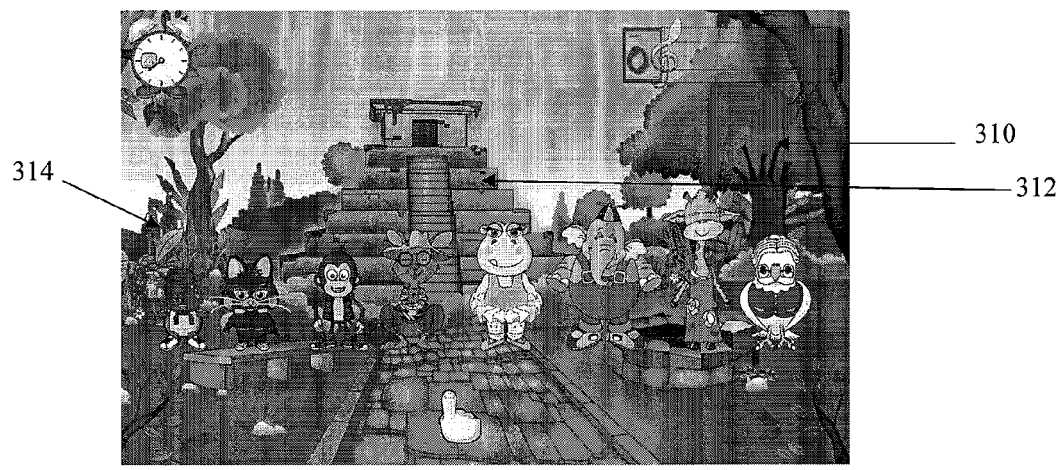
FIG. 22 is a pictorial representation of several game screens representing the different level of difficulty in the game according to the present invention.

A game screen may be presented to a user that shows multiple game environments. A possible example of such a screen is shown in FIG. 22, which is a pictorial representation of a game screen displaying game environments. The game environments shown in FIG. 22 include: the pond; the forest 310; the temple 312; the jungle 314; the city; and the theatre stage. Each environment may correspond to a level of difficulty. For example, in FIG. 22, the easiest level may correspond to the pond environment, and the most difficult level may correspond to the theatre stage environment. A skilled reader will recognize the variety of game screens and elements included therein. A skilled reader will further recognize the many possible environments or other representations that may be utilized to distinguish levels of difficulty within the present invention.

Figure 23:
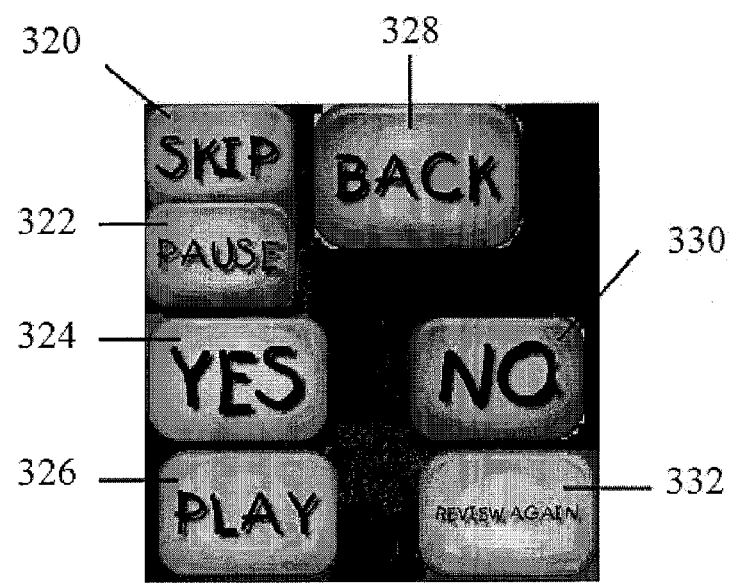
FIG. 23 is a pictorial representation of the controller module which helps to navigate into the computer program.

The present invention may include a controller module, which may be accessed and utilized by a user. An example of a possible controller module that may be included in an embodiment of the present invention is shown at FIG. 23. The controller module may be operable to assist a user to navigate through the menu of the present invention, including any exercises, games, or other elements of the present invention. In the example controller module shown in FIG. 23, the controller module may operates like a DVD menu to allow a user to control the progression and function of the present invention. The controller module may offer multiple functions and options, for example, such as an option to repeat the instructions, to pause, or switch exercise, or to return to a general menu of options. The controller module may be composed of a controller bar that may appear on a screen, such as a game screen. For example, the controller bar may appear in the upper or lower part of the screen, or on the side of the screen. The controller bar may display several buttons, for example, such as the following buttons: a SKIP button 320 may be operable to cause the present invention to skip the screen and move to the next scene; a PAUSE button 322 which may be operable to cause the present invention to pause the current screen; a YES button 324 which may be operable to provide input that is a positive response to a question; a PLAY button 326 which may initiate an exercise after the instructions are provided to a user, or may cause the present invention to unpause a current screen; a BACK button 328 which may cause the present invention to go back to the previous screen; a NO button 330 which may be operable to cause the provide input that is a negative response to a question; and a REVIEW again button 332 which may be operable to cause the present invention to review an example for the user.

Figure 24:
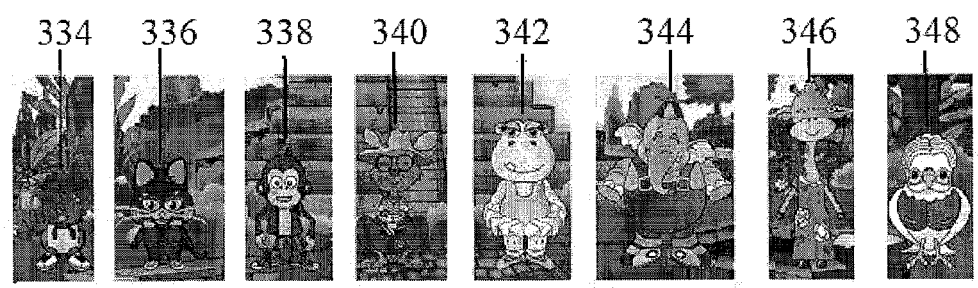
FIG. 24 is a pictorial representation of a game screen for each animal/character button used in the training of the present invention with a Maya temple environment as a background according to the present invention.

Several pictorial representations may be utilized in the present invention. For example, animal characters may be utilized, as shown in FIG. 24. The animal characters may include the following: Do the Turtle 334; Re the Cat336; Mi the Monkey 338; Fa the Kangaroo 340; Sol the Hippo 342; La the Elephant 344; Ti the Giraffe 346; and Miss Bird 348. The animal character buttons may allow the user to answer questions of the exercises such as "which animal corresponds to C4?". A skilled reader will recognize that other representations, pictorial or otherwise, may be associated with aspects of the present invention, for example, such as musical notes, or particular questions, etc.

Figure 25:
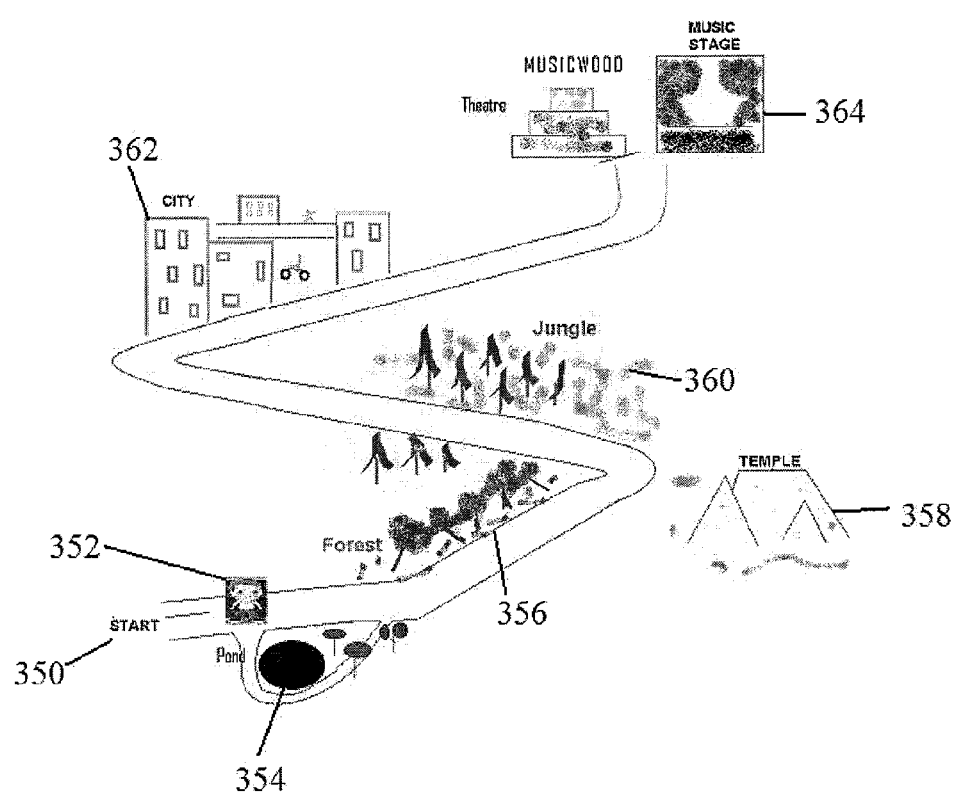
FIG. 25 is a graphical representation of the interactive map in which the user could see is position in the game and his progress according to the present invention.

The present invention may provide a variety of types of feedback to a user. As an example, the present invention may provide feedback regarding a user's level of performance to a user in the form of an interactive map, as shown in FIG. 25. The interactive map may indicate to the user his performance status and performance progress by utilizing a pictorial scale. The user may be represented by the image of a little boy or girl 352. The image of the boy or the girl representing the user may initially be positioned at the bottom of the map 350, and the image may reach different steps following his performance in the curriculum mode or the free exercise choice mode, as previously described. The user may known that he has reached the most difficult level when the image of the boy or girl is positioned on the map on the theatre stage 364. In this example, the order of levels in as follows: The Pond 354; The Forest 356; The Temple 358; The Jungle 360; The City 362; and the Theatre Stage 364. Ninety levels may be represented between The Pond 354 and the Theatre Stage 364. A skilled reader will recognize that other forms of feedback regarding a user's progression through levels of difficulty may be provided to a user and that this feedback may be oral, pictorial, textual or provided in any other means to a user.

Figure 26:
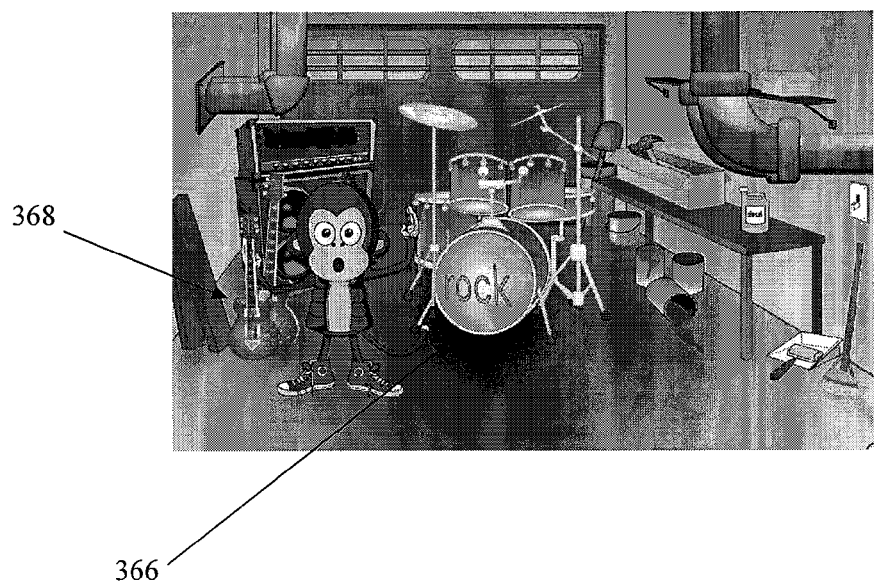
FIG. 26 is a pictorial representation of a game screen in which the user is receiving a prize: guitar prize animation.

In embodiments of the present invention prizes or rewards may be provided to a user. For example a prize module may rewards the user throughout the training exercises via the presentation of an animation, as shown in FIG. 26. The prize animation may be displayed in the center of the screen 366, and may be in the form of a guitar prize animation 368 as shown in FIG. 26. A skilled reader will recognize that other forms of prizes and rewards may be provided by a prize module to a user.

A link may exist in the present invention between prizes and levels of difficulty. Prizes and animations can occur either independently or dependently based upon the user's performance. The provision of prizes may be scaled to each individual user. For example, a user who is making slower progress than another user may receive a prize for reaching a less difficult goal.

Figure 27:
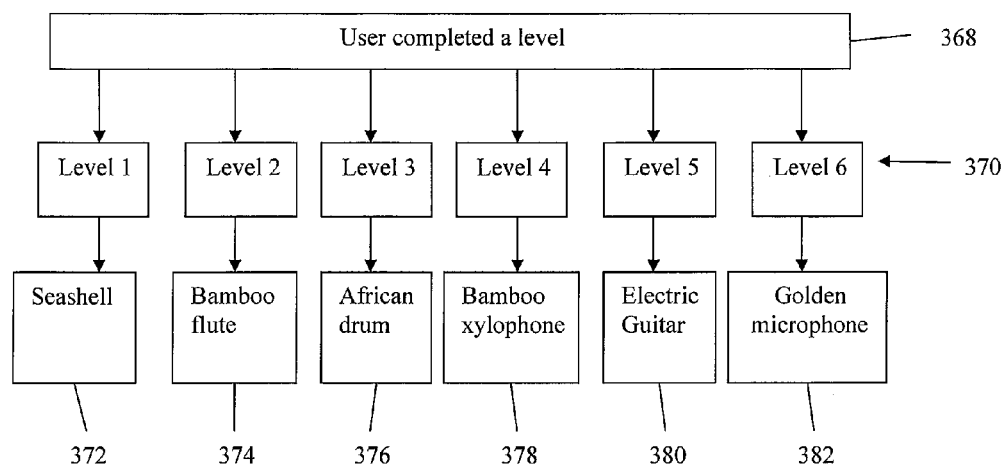
FIG. 27 a flow chart showing how each level of difficulty in the method of the present invention is related to a specific background environment.

As an example, after the completion of a level a user may receive a prize 368, as shown in FIG. 27. In the possible embodiment of the present invention shown in FIG. 27, in Level 1 370—The Pond, a seashell animation 372 is the prize animation. In this animation, the Seashell is coming out of the pond and Miss bird blows in it and the user can hear a melody; In Level 2 370—The Jungle, a Bamboo flute 374 is the prize animation. In this Animation, the Bamboo flute is falling from a three and Monkey blows in it and the user can hear a Maya melody; In Level 3 370—The Temple, an African drum 376 is the animation. In this Animation, the African drum appears at the top of the temple (e.g., skyview). Elephant is playing with his arms and his horn and the user can ear a tribal melody; In level 4 370—The forest, a Bamboo xylophone 378 is the prize animation. In this Animation, a piece of wood comes down from each three of the forest. The wood pieces form the Bamboo xylophone. Turtle is playing with some wood stick and the user can hear a melody; In Level 5 370—The City, Electric Guitar 380 is the prize animation. In this animation, a speedy car arrives and Tiger is jumping off of it with an electric guitar. He is playing a rock melody. He gives the guitar to a kid and the guitar goes up in the sky; In Level 6 370—The Theatre Stage, the Golden microphone 382 is the prize animation. In this Animation, MissBird approaches the center of the stage and says "You are fantastic, One of my favorite students!! You finished the last level of this game! Congratulations!! I want to offer you the Golden Microphone. When you have all the Golden Microphones, you will be a music master!!!".

The prize and animation modules may be linked to the tracking progress module. The data collected during sessions of the present invention may define the performance goals applicable to each user. Through the information collected by the tracking progress module, the present invention may deliver prizes after each goal reached and after each level completed by the user. The performance goals may be set at different marks than performance rates. Performance goals may not correspond to performance rates that may be required for a user to increase a level of difficulty. The performance goals may be set at marks that may be reached by a user after an amount of effort deemed to be challenging to a user in accordance with the characteristics of the user as are identified in the information and/or data collected regarding the user, such as user performance, user age, time to complete an exercise, etc. Performance goals and the achievement of performance goals may be set in accordance with analysis undertaken by an analysis module of the present invention.

In one embodiment of the present there may be three cases of prize delivery: (1) Performance level is under 60% after the first three sessions; (2) Performance level is between 60 and 80% at the first session; and (3) Performance level is over 80% at the first session. For case (1), the user will receive a prize after each exercise for lesson 3 to 6 and will receive prizes depending on performance after lesson 6. Performance should be over 65%. For case (2), the user will receive a prize after each session from lesson 1 to 6 and will receive prizes depending on performance after lesson 6: Performance of each session should be over 65%. For case (3), the user will receive prizes after the completion of each level. Performance should be over 75%. A skilled reader will recognize that other prize deliveries are possible in the present invention and that prize delivery may occur at different points in time in embodiments of the present invention, such as after an exercise, after a lesson, after module, or during an exercise, lesson or module. The prize delivery points may be chosen in accordance with the characteristics of the user.

Figure 28:
FIG. 28 is a pictorial representation of a game screen in the story module of the program of the present invention.

Embodiments of the present invention may include a story module. A possible embodiment of a story module that may be included in the present invention is shown in FIG. 28 as a pictorial representation. Specifically, FIG. 28 shows the meeting between one of the characters X and another character Y in the pond environment. The present invention may utilize a cartoon video to introduce a character or environment to a user and to familiarize the user with the animal characters, environments, goals of the training, training components 383, and the basic music concepts to be used in the training.

Study Results

Figure 29:
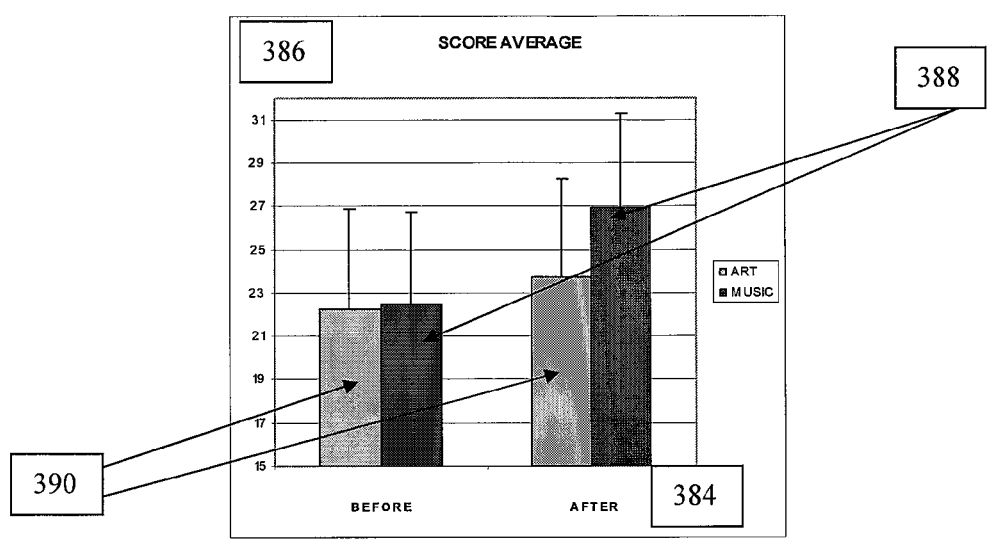
FIG. 29 is a graphical representation of the study of the present invention results showing the verbal intelligence score of the method of the present invention and the control groups before and after training.

The present invention may be utilized to generate study results. The study results may represent analysis of information or data corresponding to one or more users of the present invention. The study results may be generated in response to a specific question, for example, such as the average time that a user of 4 years of age takes to complete a level 1 rhythm exercise, or any other research question. Study results may be provided in a variety of forms by the present invention. As an example, a graphical representation of study results showing the verbal intelligence score of a training group of users and a control group of users before and after training is shown in FIG. 29. Abscissa axis shows the before and after training sessions 384 and the ordinate axis shows the average score in verbal intelligence 386. Music training is represented by two bars 388 and the control group training involved in art training is represented by two bars 390. FIG. 29 shows significant improvements in verbal intelligence for the training group 388.

Figure 30:
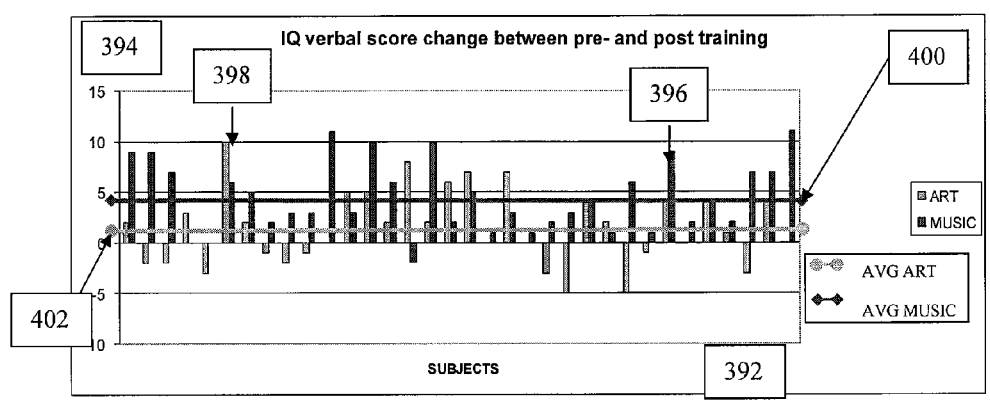
FIG. 30 is a graphical representation of the study results of the present invention showing the verbal intelligence score change between before and after training for each individual in the method of the present invention and the control groups.

As an additional example, FIG. 30 shows a graphical representation of study results representing the verbal intelligence score change between session, for example, such as after minus before training in ordinate axis 394 and each individual subject in abscissa 392 for the group undertaking the method of the present invention 396 involving music training, and the control group 398 involved in art training. The graphic also displays two lines which represent the average score of each group. The line 400 represents the average score of verbal intelligence score change for the training group of the present invention and the line 402 represents the average score of verbal intelligence score change for the control group. The strength of this effect and its consistency are striking: over 90% of the children involved in the method program of the present invention improved their verbal intelligence score.

As still another example, FIG. 31 shows a graphical representation of study results representing the rhyming score in ordinate axis 406 and before and after training sessions in abscissa 404 for the method of the present invention 408 involving music training and the control group 410 involving art training. This graphic is showing the significant improvements in rhyming score for the training group of the present invention 408.

Figure 32:
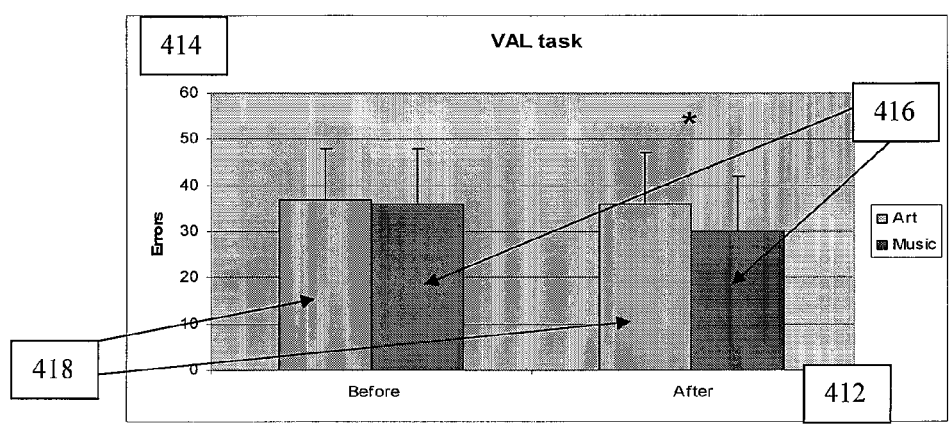
FIG. 32 is a graphical representation of the study results of the present invention showing the Visual Auditory learning score of the method of the present invention group and the control group before and after training.

As yet another example, FIG. 32 shows a graphical representation of the study results of the present invention representing the Visual Auditory Learning score in ordinate axis 414 and before and after training sessions in abscissa 412 for the method of the present invention 416 involving music training and the control group 418 involving art training. This graphic shows the significant decrease in Visual Auditory Learning score for the training group of the present invention 416 who achieved a higher performance.

Figure 33:
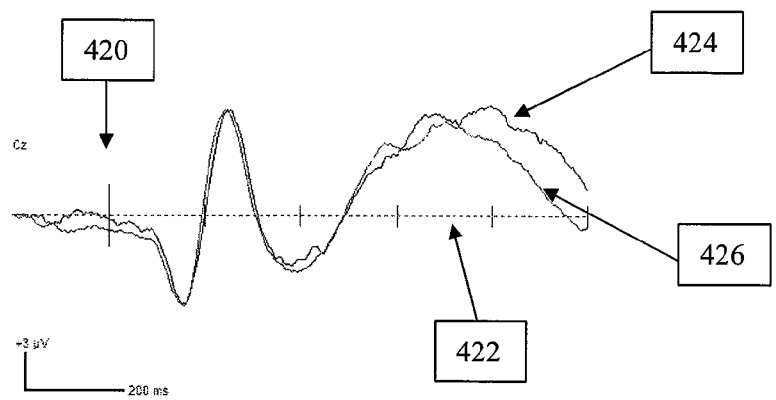
FIG. 33 is a graphical representation of event related brain potential average (i.e., across all the participants of the present invention) to an attention task. It represents the group means ERP elicited by Go stimuli in a Go/Nogo task at Cz site.

As still another example, FIG. 33 shows a graphical representation of event related brain potential average across all uses of the present invention to an attention task. The graph represents the group means ERP elicited by Go stimuli in a Go/Nogo task at Cz site. This brain functioning data was recorded before 424 and after 426 training of users on the present invention. The ordinate axis represents microvolt amplitude of brain signal 420 and the abscissa axis 422 represents the brain signal time course from −200 to 1000 milliseconds. The wave 424 represents pre-test data and the wave 426 post-test data. FIG. 33 illustrates the similarities in the brain responses related to Go stimuli.

Figure 34:
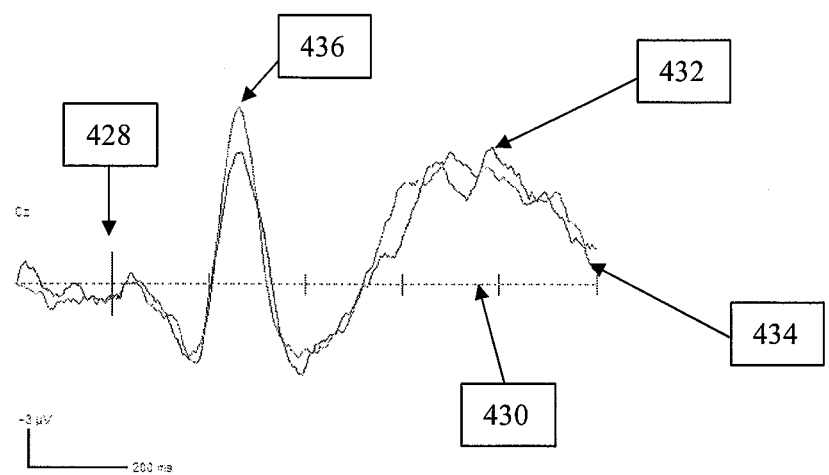
FIG. 34 is a graphical representation of event related brain potential average (i.e., all the participants of the present invention) to an attention task. It represents the group means ERP elicited by Nogo stimuli in a Go/Nogo task at Cz site.

As another example, FIG. 34 shows a graphical representation of event related brain potential average across all users of the present invention to an attention task. It represents the group means ERP elicited by Nogo stimuli in a Go/Nogo task at Cz site. This brain functioning data was recorded before 432 and after 434 training of users on the present invention. The ordinate axis represents microvolt amplitude of the brain signal 428 and the abscissa axis 430 represents the brain signal in time from −200 to 1000 milliseconds. The wave 432 represents pre-test data and the wave 434 post-test data of the training group of the present invention. FIG. 34 illustrates the significant differences between before and after training recording 436 in the brain responses related to Nogo stimuli.

The benefits of the present invention vis-à-vis behavioural and brain enhancements in young children may be better understood by reference to the following example, which is included in here for the purposes of exemplification and is not to be construed as limiting the invention as previously described.

EXAMPLE 1

Scientific Study with 4 to 5 Years Old Children Results

In this experiment, a population of 71 children was tested in a longitudinal design: pre-test/training/post-test. The same battery of test was used in pre- and post-test.

The test battery is composed by three tasks:
IQ test (WIPPSI; FIGS. 2, 2a),
Language tests battery (3, 4)
Attention task (Go-Nogo task; FIGS. 5, 6) in which brain activity was measured.

Neural Networks Stimulation

The method is based on the principle that transfer occurs when the novel and trained tasks involve overlapping processing components and engage a shared brain region. Overlapping processing and brain areas explain transfer effects between the method and intelligence, attention, reading and language skills. Music and language are sharing cognitive activities processes and brain. By using specific exercises, brain areas involved in intelligence, attention, reading and language skills are stimulated: Rhythm: right hemisphere of the brain; Voice/Singing: Heschl gyrus and left hemisphere of the brain, Brocas and Wernicke areas; Verbal memory: planum temporale, pre-frontal and fronto-ventral areas; Theory: parietal and occipital cortex; Ear/discrimination: auditory related brain areas and frontal and parietal cortexes.

Participants

Seventy-one children between the ages of 4 and 6 years old were recruited from various neighborhoods in the Greater Toronto Area. Data from 7 participants were discarded because they stopped the summer camp after 2 weeks (3), two children got sick, and two could not speak English fluently. The final sample comprised of 64 children (14 boys/18 girls in the control group and 12 boys/20 girls in the music group; see Table 1 for background data). The groups did no differ on age ($p>0.8$; 63.8 and 63.7 respectively) or mother's education ($p>0.6$; average education was a bachelors degree). The study received York University Research Ethics Committee approval and all parents signed informed consent. Before testing period, every child was asked whether they wanted to participate.

Parent Questionnaires

A background questionnaire was provided to every parent in order to screen out children who had had previous music or visual art training, as well as to match each group on level of mother's education. Table 1 contains detailed demographic information, broken down by each of the training groups.

Training

During four weeks, 4- to 6-year-old children played computer games (projected on the classroom wall and involving groups of students) with their respective teacher for two sessions of 45 minutes each day. Teachers began the training session with a 45-min lesson, followed by a 1-hour break and a second 45-min lesson. Breaks consisted of outdoor games in the garden of the school (e.g., hide and seek, ball games) in which children could run and play. The team of teachers distributed snacks and beverages during the breaks. Children were randomly involved in the morning or the afternoon session. Thirty-five children were involved in the morning training session and 27 in the afternoon training session, mainly based on parental convenience reasons. The computerized experimental and control training programs were created by Dr. Sylvain Moreno and based on neuroscientific findings. Visual aspects of both training programs were designed by two classes at George Brown College School of Design in Toronto. The computerization of training allowed the researches to control each lesson and to adapt the training progress to each class. Both training programs shared the same learning goal, graphics and design, duration, number of breaks, and number of teacher staff. The only differing element was the content of the training. Each lesson was conducted by 1 teacher, 3 teaching assistants and one research assistant. Teachers were recruited based on two criteria: previous experience with preschool children and a Master's degree in music or art. The goal of the research assistant was to take note of each teaching session and to control both trainings. During the training, the research assistants were seated in a corner of the room and were not participating or interfering during the teaching. In both groups, one teacher conducted the class during two weeks and two other teachers during one week each. The video games were directed by the teacher in a class format. The teacher had to follow the software curriculum in both training groups. The curriculum in music was based on a combination of motor, perceptual, and cognitive tasks and included training on rhythm, melody, pitch, voice, and basic musical concepts such as musical staff; and in visual art, training emphasized the development of visuo-spatial performance on several components such as light and color, line, perspective, material, and texture. At the end of the training, music and art teachers had to evaluate each child on a scale from 0 to 7 on several skills taught during the training. A minimum score of 5 was required to consider the training successful. Teachers were not aware of this criterion. All children completed the training with a minimum 5 as average grade on a scale of 7 points. Both the control training and the music video game were administered to children in separate rooms at the school. Both types of training were described by teachers and parents as challenging, interesting, and rewarding experiences for the children. Thus, none of the parents complained that their child followed one type of training and not the other. When speaking to the parents, there was a general consensus in their gratitude for free music and visual art lessons. The end of the 20-day training session was characterized by the children's art exhibition as well as a concert depicting the skills they had learned through the training. Parents were glad to offer feedback relating to the improvement of the behavior and skills of their children. Several families expressed interest in purchasing this training program and others asked to continue partaking in further training camps. Many parents took it upon themselves to engage their child in art programs as a result of the summer camp. A few months after the training program was complete, a certificate ceremony was organized for the children. During this ceremony, children received a certificate of participation as well as a DVD of their participation in the camp. This DVD included footage of them engaging in the program. Children were also given small toys and stickers at the pre-test and the post-test stages.

Stimuli a. Pitch

One of the applications of pitch in all the exercises is music tone recognition. Should the game player choose Rhythm, Voice Awareness, Musical Ear, Theory or Creativity exercises—the pitch plays a central role in the learning process. From being a key reference linking to the animal character objects in this game to the driving force in a student's hearing development the pitch is invaluable factor.

Another application of pitch can be found in the Musical Product exercises. Here a student focuses on applying the mastered elements of rhythm and melody covered during the prior exercises. For this purpose the pitch is chosen to suite the vocal range and ability of an average student of the target age group.

b. Melody

In addition to the above noticed elements in Musical Product Exercises, the melody is central in forming musical phrasing. Fairly repetitive melodies allow easier memorization. The flow and development of the melody emphasizes on the emotions and reflects the mood different in each exercise of the Musical Product category.

In Voice Awareness Exercises the use of melody compliments the character's movements in "Hippo Goes To a Dance Lesson", facilitates the musical scale practicing in "Singing Lesson With Giraffe", adds fun to vocal range exercising in "Rock 'Till Bedtime" and help memorizing the catchy repetitive phrase of Kangaroo character in "Animals Have Sounds":

"The animals have sounds they make with their voice Animals have sounds they use them by choice . . . "

c. Rhythm

The use of rhythm is best illustrated in Rhythm Curriculum Exercises in this game. A player learns to recognize and follow rhythms, while observing and repeating game characters' movements almost effortlessly.

From the first rhythm experience in "Walking Like The Animals", getting comfortable with it in "Jump, Jump Stop!", familiarizing with the concept of tempo differences and learning to discriminate between various tempos in the exercises such as "Slow, Medium, Fast" and "Dancing With the Animals", exercising "Feeling The Beat"—all that leading to the practical application of creating the rhythms in "Rhythm Building" exercise.

d. Sounds

The use of sounds has become one of the most favorable choices widely applied for playing and early education of children. For an easy start recalling the sounds from those they hear at home in Voice Awareness exercise "Turtle Gets Ready For School", and those produced by the mostly familiar animals, such as mouse, dog, cow and sheep in "Animals Have Sounds" bridges later to the also familiar sounds produced by wild animals, birds and nature in "Miss Bird On Nature Walk". The development of voice recognition and tone characteristics turns the learning into entertaining games.

Procedure

Children were tested using a 3-phase longitudinal design, pre-test/training/post-test. The pre- and post-test stages involved the same tests. The separate components of the test battery were randomized for each child. The testing took place in laboratory facilities and lasted 30 minutes. Children were tested in an experimental room with a blind research assistant (not knowing in which training the child will be or was involved in) randomly assigned. Four female research assistants took part in the testing. The same research assistants participated in the pre- and post-test phases. All research assistants had a bachelors degree with a major in psychology. All research assistants were trained by the same person on how to assess the intelligence score. Before the testing, several meetings were organized between the research assistants to ensure that there was a consensus in the scoring process.

After pre-test, children were pseudorandomly assigned to musical training or to visual art training (control group) to ensure that there were no prior-to-training differences between groups on the intelligence score and background questionnaire. All the children followed both training during 20 days at the Royal Conservatory in Toronto with the help of the art program, Learning Through The Arts (www.ltta.ca). After training, children came back to the laboratory facilities to again be assessed on a variety of cognitive measures. After the post-test, all research assistants reviewed the children's intelligence scores to ensure a consensus on each child's score.

IQ Results:

WPPSI (Wechsler Preschool and Primary Scale of Intelligence) is an intelligence test designed for children ages 2 years 6 months to 7 years 3 months developed by David Wechsler. The current revision, WPPSI-III, is published by Harcourt Assessment. It provides subtest and composite scores that represent intellectual functioning in verbal and spatial domains. The short version of this measure was used, which comprised of two subtests: Vocabulary and Block Design. Examples of these tests are shown in FIGS. 29 and 30.

a. Vocabulary

The Vocabulary subtest contains 32 words arranged in order of increasing difficulty. The child is asked to orally explain orally the meaning of each word (for example, "What is a _____?" or "What does mean_____?"). The subtest is discontinued after five consecutive scores of 0.

b. Block Design

The Block Design subtest contains 11 items, consisting of two-dimensional, red-and-white pictures of abstract designs. Examinees must use red and white blocks to assemble a design identical to that in the picture. The patterns are arranged in order of increasing difficulty—four blocks are used for the first eight designs, and nine blocks are used for the last three designs. All items are timed: items 1 to 4 are given a maximum of 45 seconds each; items 5 to 8, 75 seconds; and items 9 to 11, 120 seconds. Items 1 to 3 are scored 2, 1 or 0; items 4 to 11 receive 4 points for a correct completion and up to 3 additional time-bonus points for quick evaluation. The subtest is discontinued after three consecutive scores of 0.

The results showed a significant interaction effect between group and pre- and post-test ($p>0.001$). Both groups had the same level of performance pre-test (average verbal IQ: 22.4 vs 22.9) but the neuroscientific software group (26.9) outperformed the present invention control group (24.3) post-test.

In FIG. 29, the verbal IQ score average of both groups can be seen. Moreover, FIG. 30 shows how this experimental effect is spread across the neuroscientific software group; almost every child improved his IQ score over the children in the control group for which changes were random (⅓ positive change; ⅓ no change; ⅓ negative change).

Language Results a. Rhyming test:

This test is related to phonological awareness: early reading achievement. In this test, the child's ability to provide a rhyming word (number of word) when given a stimulus word was assessed. Thirty children in both groups were analyzed pre- and post-test. Performance in both groups were similar to pre-test ($p>0.24$; t-test) but not post-test ($p<0.05$; t-test). The training group (Before: 9; After: 12) outperformed the control group (Before: 8; After: 9). An example of this test is shown in FIG. 31.

b. Visual Auditory Learning test:

This test is related to phonological awareness and assessed the participant's ability to generalize his knowledge of sound/symbol correspondence and to blend sounds into unknown words. Results suggest a significant difference between the groups post-test (p<0.05; Gr×Session interaction) and not before. Groups scored similar performance pre-test (score for Music: 36; Art: 37) but post-test, the training group (score: 30) outperformed the control group (score: 36). After the training, children (in music) are making fewer mistakes than the control group in Visual Auditory Learning test. An example of this test is shown in FIG. 32.

Attention Results:

Researchers were able to analyze only 9 subjects in the training group (neuroscience based software) pre- and post-test. Example of these results are shown in FIGS. 33 and 34.

A Go/Nogo task was used in which participants have to press a button when they see a white shape and do not press a button when they see a purple shape. In the Go condition, no differences were observed pre- and post-test. However, a significant peak amplitude difference between before and post-test was observed (Before: 7.3 µV; After: 11.6 µV; p<0.05). This component is related to conflict/decision brain processing. The training modified brain processes related to conflict resolution.

The scientific results also showed that brain modification in the attention task positively correlate with Verbal IQ score (r=0.44; p<0.5).

In conclusion, these data provide extremely strong support for the efficacy of the training/therapies embodied in the present invention. It has been demonstrated that these therapies significantly improve intelligence, language and attention skills. Moreover, the success rate of this technology is extremely high because over 90% of children are showing an improvement in intelligence score after the training.

What is claimed is:

1. A computer implemented method for training cognitive ability of a user, said method being implemented by one or more computer processors and comprising:
    a. operating a processor to group at least two exercises selected from at least two of the following musical exercise categories: rhythm; voice awareness; musical ear; music theory; musical product; and creativity into one or more exercise training modules,
    wherein the exercise training modules comprise two or more levels of increasing difficulty;
    wherein at least a first exercise in said exercise training modules require the user to make a single selection;
    wherein the selection is made in order to answer a question presented to the user;
    wherein the selection reflects a choice which distinguishes a particular visual cue paired to a musical sound and at least one other visual cue paired to a different musical sound, said choice recognizing the relationships between tones and visual cues;
    wherein at least a second exercise is also presented to the user, said second exercise not requiring a selection from the user and pairing non-musical notation visual cues with corresponding musical sounds in order to present to the user a correct relationship between the non-musical notation visual cues and the musical sounds exercise being presented to the user separately from the first exercise;
    b. operating a processor to provide feedback to the user contingent upon the single selection; and
    c. operating a processor to present the at least two exercises to the user as part of one of the one or more exercise training modules, said exercises each being at a level of difficulty appropriate for the user.

2. The method of claim 1, comprising the further step of monitoring and analyzing the user's performance for each exercise of the exercise training module; and producing an exercise result relating to the user.

3. The method of claim 2, comprising the further step of identifying the exercise result as pass or fail.

4. The method of claim 1, comprising the further steps of:
    a. posing one or more memory questions to a user after the exercise by applying a memory module to the exercise;
    b. generating an exercise result reflecting a performance rating of correct selections to the one or more memory questions compared to the total number of possible correct selections.

5. The method of claim 1, comprising the further step of assessing the user's performance by monitoring the user's interaction with the exercise by using at least one of the following: a webcam; a keyboard: a computer mouse; microphone; accelerometer, a specially designed electronic glove; and a sensor.

6. The method of claim 1, comprising the further step of a assessing the user's performance by utilizing information gathered during an exercise by comparing the information to prior information gathered from the user during a prior testing session.

7. The method of claim 1, comprising the further step of repeating each of the exercise training modules at least two times before advancing to the next level of difficulty, and at most 3 times if the user's performance is assessed to be below a performance target.

8. The method of claim 7, comprising the further step of determining the performance rate target to be at least a selected percentage of the exercise training modules.

9. The method of claim 8, comprising the further step of setting the selected percentage to be approximately: 65% to 85% correct responses to questions posed by a memory module after an exercise; or 65% to 85% overall performance.

10. The method of claim 1, comprising the further step of pairing of an animal character and a musical note in each exercise training module, whereby the animal character represents the musical note.

11. The method of claim 1, comprising the further step of the exercise training module presenting exercises in which the user moves body parts in synchronization with a musical rhythm as a rhythm category of exercises, wherein the body part is specifically indicated to be at least one of the following: hands; arms; shoulders; feet; legs; head; or whole body, and wherein the movement is not related to music production.

12. The method of claim 11, comprising the further step of presenting a reference rhythm having occurrences separated by time intervals for each difficulty level so that difficulty is related to at least one of the following:
    increasing tempo; slowing tempo; medium tempo; alternating tempo; and fast tempo.

13. The method of claim 1, comprising the further step of the exercise training module for the voice and vocalization category comprises exercises in which directions for enhancing, constructing or expressing meaning, and directing the user to perform tasks requiring performing vocal range, volume, scooping voice, vocal ornamentations, voice projection and teaching vocal mime are provided.

14. The method of claim 1, comprising the further step of teaching a user to discriminate musical tones by utilizing the exercise training module for the musical hearing/auditory training, sound discrimination/recognition and music theory categories.

15. The method of claim 14, comprising the further step of presenting exercises to a user in the music theory category that involve directions for enabling the user to recognize the relationship between music tones and characters, and relationships between spaces and lines of a music staff and musical tones.

16. The method of claim 1, comprising the further step of the exercise training module for the singing training category requiring the user to learn singing skills and song lyrics, including combinations of body movements related to the song lyrics.

17. The method of claim 1, further comprising the step of the exercise training module for musical creativity category requiring the user to produce and perform puzzles, musical melodies, songs and body movements.

18. A system of music based cognitive training comprising:
(a) at least one computer; and
(b) the computer configured to operating a computer processor to run a computer program including computer instructions processable by the computer processor, which when made available to the at least one computer, are operable to define a music based cognitive training utility that is operable to improve one or more cognitive functions of an individual, wherein:
   (i) the music based cognitive training utility includes or defines a series of exercises consisting of musical exercises linked to improving cognitive function, and that cumulatively define a music based cognitive training module, wherein each of the series of exercises includes two or more exercise components, the exercise components being associated with different levels of difficulty
   wherein at least a first exercise in said exercise series require the user to make a single selection;
   wherein the selection is made in order to answer a question presented to the user;
   wherein the selection reflects a choice which distinguishes a particular visual cue paired to a musical sound and at least one other visual cue paired to a different musical sound, said choice recognizing the relationships between tones and visual cues;
   wherein at least a second exercise is also resented to the user said second exercise not requiring a selection from the user and pairing non-musical notation visual cues with corresponding musical sounds in order to present to the user a correct relationship between the non-musical notation visual cues and the musical sounds, the second exercise being presented to the user separately from the first exercise;
   (ii) the music based cognitive training utility includes or is linked to a performance monitoring utility for monitoring and recording the performance of the individual in each exercise component;
   (iii) the music based cognitive training utility being operable to present to the individual, once the individual has achieved a minimum performance threshold for a first exercise component, a subsequent second exercise component or N exercise component where N is an integer equal or greater than 2, which requires a selection from the user, and which is associated with an increasing level of difficulty relative to the preceding exercise component, based on operation of the performance monitoring utility such that the music based training facility is operable to enable adaptive training of the individual to improve iteratively the performance of the individual following the music based cognitive training module, thereby providing improved cognitive functions through music based training.

19. The system of claim 18, wherein the music based cognitive training module incorporates tasks involving both acoustic and verbal stimuli.

20. The system of claim 18, wherein the music based cognitive training module also incorporates one or more memory exercises in which the individual is asked to confirm one or more items learned in one or more preceding exercises.

21. The system of claim 18, wherein the music based cognitive training utility is operable to adjust the level of difficulty of each exercise based on the performance of the individual for that exercise in a particular music based cognitive training module.

22. The system of claim 18, wherein the music based cognitive training utility is operable to provide feedback to the individual regarding their performance.

23. The system of claim 18, wherein the performance monitoring utility is operable to evaluate the individual based on recent learning.

24. The system of claim 18, wherein each music based cognitive training module includes one or more story components including one or more characters and a story line, wherein one or more of the exercises are presented using the one or more story components.

25. The system of claim 18, wherein music based cognitive training utility defines: (a) at least one exercise based on rhythm, followed by; (b) at least one auditory exercise; and (c) at least one singing exercise.

26. The system of claim 25, wherein the music based cognitive training utility further defines at least one exercise based on voice and vocalization.

27. The method of claim 1, further comprising a difficulty appropriate for the user, wherein the difficulty is set according to at least both the age of the user and past performance.

* * * * *